United States Patent [19]

Zellweger

[11] 4,273,542

[45] Jun. 16, 1981

[54] DEVICES FOR DISPLAYING OR PERFORMING OPERATIONS IN A TWO-VALUED SYSTEM

[76] Inventor: Shea Zellweger, 1483 Robinwood Rd., Alliance, Ohio 44601

[21] Appl. No.: 44,170

[22] Filed: May 31, 1979

Related U.S. Application Data

[63] Continuation of Ser. No. 729,119, Oct. 4, 1976, abandoned.

[51] Int. Cl.³ .............................................. G09B 1/32
[52] U.S. Cl. ...................................................... 434/433
[58] Field of Search ............. 35/30, 35 R, 35 H, 35 J, 35/36, 37, 69, 70, 71, 72, 73; 283/45, 46; 273/146, DIG. 14, 272

[56] References Cited

U.S. PATENT DOCUMENTS

| | | | |
|---|---|---|---|
| 466,296 | 12/1891 | Clark | 35/73 |
| 523,676 | 7/1894 | McGrath | 35/35 H |
| 635,182 | 10/1899 | Perry | 35/73 |
| 1,162,629 | 11/1915 | Mager | 35/35 H |
| 2,386,114 | 10/1945 | Hayes | 35/69 |
| 2,723,465 | 11/1955 | Silverstein | 35/73 X |
| 3,794,326 | 2/1974 | Bialek | 273/146 X |
| 3,822,487 | 7/1974 | Koch | 35/35 J |
| 3,904,208 | 9/1975 | Grossman | 273/146 |

FOREIGN PATENT DOCUMENTS

| | | | |
|---|---|---|---|
| 659564 | 3/1963 | Canada | 35/73 |
| 749562 | 5/1933 | France | 35/73 |
| 678024 | 8/1952 | United Kingdom | 273/137 C |

*Primary Examiner*—William H. Grieb
*Attorney, Agent, or Firm*—Lee, Smith & Jager

[57] ABSTRACT

A system for displaying or performing operations in a two-valued system comprising a plurality of devices each having at least one symbol, each symbol having iconicity, eusymmetry, and frame consistency so that said symbol is consistent with respect to a selected frame of reference, said symbol further being symmetry positional so that operations in said two-valued system can be displayed or performed by changing the orientation of said symbol symmetrically with respect to said frame. This frame of reference consists of four points in a Cartesian co-ordinate system, preferably defining a basic square. The symbols are preferably letter-shaped symbols which can be assigned a phonetic value.

8 Claims, 27 Drawing Figures

FIG.1a
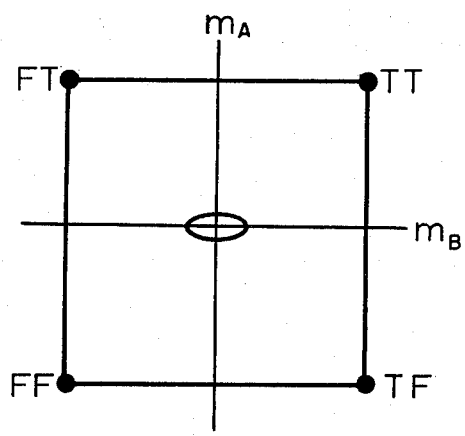
FIG.1b
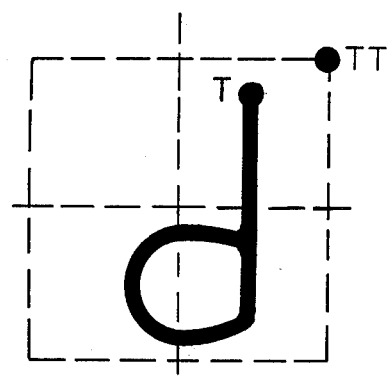
FIG.2
FIG.3
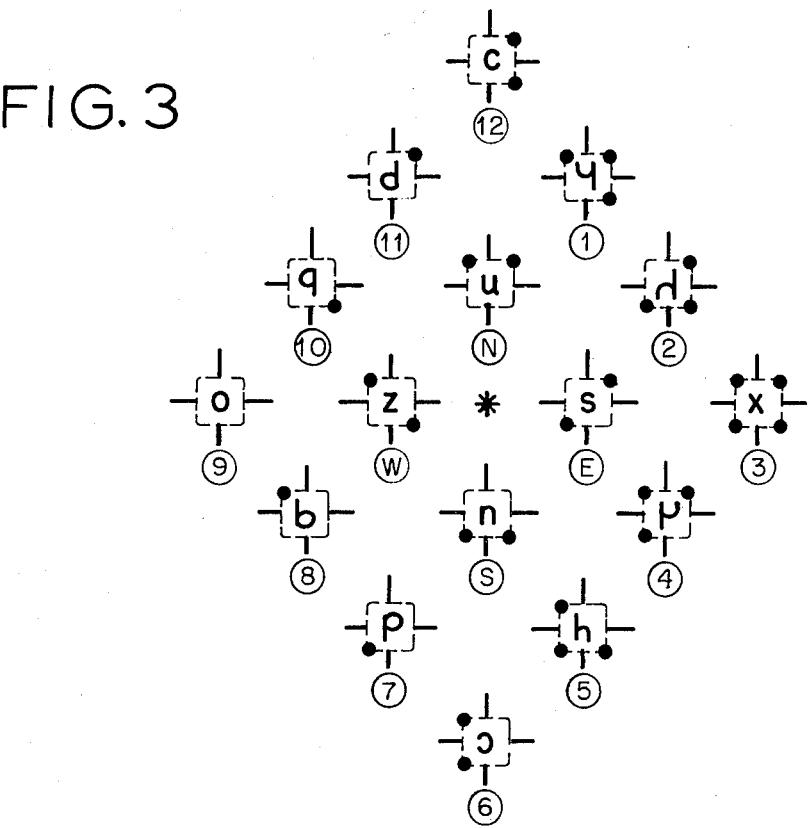

FIG. 4
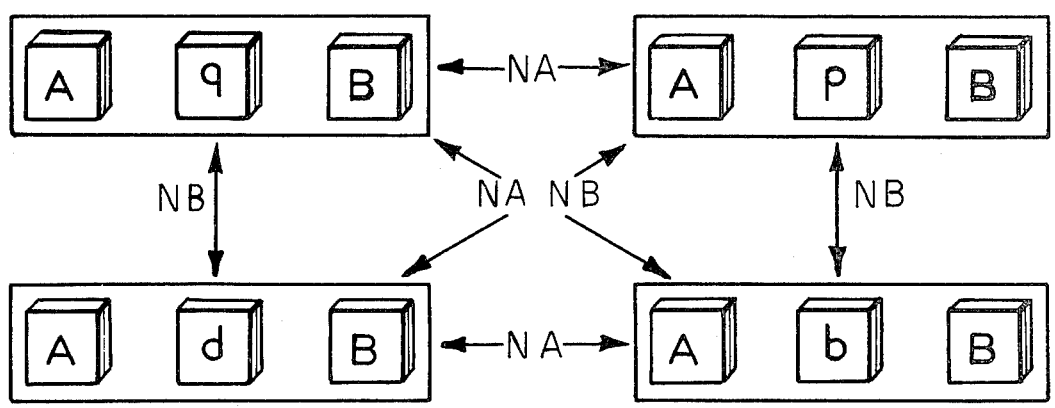
FIG. 5a
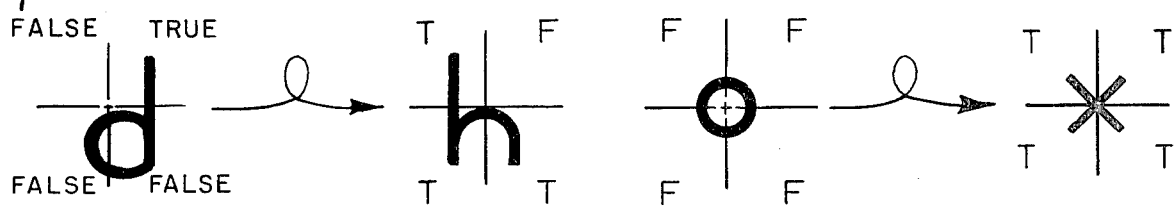
FIG. 5b

DEVICES FOR DISPLAYING OR PERFORMING OPERATIONS IN A TWO-VALUED SYSTEM

This is a continuation of application Ser. No. 729,119, filed Oct. 4, 1976, now abandoned.

BACKGROUND AND GENERAL DESCRIPTION

This invention relates generally to a special notation for symbolic logic and more particularly relates to useful and aesthetic devices for computing, teaching, demonstrating, and displaying the inner relationships in the algebra of logic, so that ordinary operations in symbolic logic can be performed with extreme calculational ease.

As is known to those skilled in the dicipline of symbolic logic, there are sixteen binary connective that exhaust all possible second-order true-false combinations for the two-valued logic of two sentences. As is also known to those skilled in this discipline, the performance of logical operations is limited by a number of inadequacies and complexities in the current notational systems. For instance, the most common notational system presently being used is the one historically evolved in the first decade of the 20th century by Peano-Whitehead-Russell, hereinafter called the PWR system.

In practice, the PWR system has several limitations. This system, for example, does not have a unique and easily recognizable symbol for each of the sixteen binary connectives (see TABLE I). The few symbols in use are a mixture of analogical and alphabetical shapes; they exist as separate entities—each as island unto itself. The interrelationships between these symbols are not immediately transparent, nor are they easily discernible by inspection; consequently, these interrelationships are not readily available to facilitate logical calculations. As a result, the symbols are cumbersome and abstract, and the interrelationships must be memorized before one is able to perform logical operations. Also, when these operations are performed, the PWR system lacks the ability to use a few, simple rules that apply uniformly when the symbols are made to act upon themselves. Furthermore, this prior system cannot be embodied or used in physical models that clearly display the interrelationships among these symbols. The absence of physical models is a decided disadvantage when it comes to teaching, demonstrating, and using the underlying structures of symbolic logic.

Another current notational system in use is the Polish system which employs a different, upper-case letter of the English alphabet to represent each of the sixteen binary connectives (see TABLE I). The alphabetical symbols of the Polish system, as in the PWR system, are also separate and isolated, which again puts a burden on memory and abstract thought, particularly when one wishes to consider the interrelationships among these symbols. Not designed to be in keeping with a few, simple, uniform rules of manipulation, the alphabetical symbols of the Polish system also cannot be acted upon directly to perform logical operations. The cumbersomeness with which interrelationships are handled in the Polish system also precludes this notation from being easily embodied in physical models for displaying, teaching, and performing logical operations.

A third notational system, one less prevalent than the previously discussed PWR and Polish systems, is the McCulloch system wherein each of the sixteen binary connectives is represented by an all-common X-frame (Greek letter "chi") to which is added the appropriate combination of dots in the four regions that surround the intersection at the center of the X-frame (see TABLE I). Although the logical meaning of each McCulloch symbol is geometrically and visually displayed, these symbols do not have distinct mnemonic values by which they can be easily identified. Also, this notation cannot be used unless the writer constantly repeats the X-frame, once for each symbol. In addition, the McCulloch system has not heretofore been used with a few, simple, uniform rules by which to flip and rotate the symbols themselves. Moreover, rules of this kind are available for these symbols only if the user is willing to endure a very awkward situation, perceptually.

As is also well-known by those skilled in the discipline of symbolic logic, there are over a dozen additional notational systems that are variations, for the most part modifications, extensions, or admixtures, of the three basic systems discussed above. In general, these variations in the notational systems include the several disadvantages listed above with respect to the three basic systems of PWR, Polish, and McCulloch.

In view of the above background and the existing notational systems used in symbolic logic, it is the object of this invention to devise a new notational system, namely, the logic alphabet, for which carefully combined features yield advantages that overcome the above noted disadvantages of the current notational systems.

Most of all, the logic alphabet of this invention is a direct continuation of, in some ways a completion of, the notational efforts of Charles Sanders Peirce (1839–1914). Expression of his efforts can be found in his Manuscripts 429, 431, and especially 530, as numbered in R. S. Robin's annotated catalogue of Peirce's papers. Perspective in regard to the works of Peirce is best obtained by way of the scholarly efforts of Max H. Fisch (1900–   ), who is presently the General Editor of the Peirce Edition Project. This project entails the preparation of a new edition of Peirce's writings, expected to run to fifteen volumes. For an example of Professor Fisch's work, see the article entitled "Peirce's Arisbe: The Greek influence in his later life," which is found in the journal called "Transactions of the Charles S. Peirce Society" (1971, Volume 7, Pages 187–210).

First and foremost, the logic alphabet of this invention is a lesson in man-sign engineering. That is to say, the act of notation building is conducted in such a way that the new symbolism meets two requirements. First, it possesses mind-brain economies that fit the psychological characteristics of the person. Second, it possesses the same interrelatedness among its symbols that exists among the logical meanings being expressed. In effect, each symbol of the logic alphabet, like a small organism, is well adapted both to the society of people who will use it and to the society of symbols that will be used with it.

Fulfilling the requirements of man-sign engineering leads to a new approach. Unlike the decimal system used for numbers, which is a notation that is base consistent and value positional, the logic alphabet of this invention is a notation that is frame consistent and symmetry positional. That is to say, logical operations are performed by means of non-numerical motions, namely, by changing the positions of the symbols when symmetrically placing them in different orientations.

The logic alphabet of this invention, unlike the PWR system, is complete in the sense that a special set of shapes is assigned to all of the sixteen binary connectives, namely, certain shapes that are taken from the lower-case letters of the English alphabet (see TABLE I). Unlike the Polish system, the logic alphabet of this invention also gives a central role to some geometric properties that are, by careful selection, an inherent part of the letter-shapes themselves. In addition, unlike the McCulloch system, the logic alphabet of this invention is phonetic. Each symbol is identified with a distinct associational and mnemonic sound value, in most cases the same one that is assigned to the corresponding letter of the alphabet in normal use for reading. Consequently, the combined advantages of the logic alphabet of this invention not only go beyond the fragmentary advantages of the PWR system, but also give the geometric advantages of the McCulloch system to a Polish-like system, and conversely, give the phonetic advantages of the Polish system to a McCulloch-like system.

A key consideration is how best to think about the fact that the logic alphabet of this invention is constructed from symbols that are letter-shapes. Heavily weighted toward opposite extremes, the Polish and McCulloch systems are split-brain notations. That is to say, the Polish system favors the alphabetic and algebraic side, the letter side of letter-shapes; and the McCulloch system favors the iconic and geometric side, the shape side of letter-shapes. The PWR notation is so much in the fragmentary and analogical direction that it does not, in any systematic way, really participate in this distinction. In these terms, and by a contrast that grows out of a proper synthesis, the logic alphabet of this invention is a combined brain, better yet, a unified brain notation. That is to say, the logic alphabet simultaneously and structurally incorporates both sides of the algebraic and geometric extremes, both the letter and the shape aspects of letter-shapes, thereby making it possible to design a symmetry positional notation that is phonetic-iconic.

Unlike the PWR and Polish systems, the logic alphabet of this invention has iconicity. That is to say, the visual meaning assigned to each letter-shape is a matching image of its logical meaning. Furthermore, by carefully adapting iconicity to another feature called frame consistency, the logic alphabet in accordance with this invention has eusymmetry. That is to say, also unlike the PWR and Polish systems, and unlike the McCulloch system as heretofore practiced, each letter-shape in the logic alphabet has been carefully selected so that, as a matter of good symmetry, it uniformly participates in one, all-common set of geometric orientations, namely, the same system of flips and rotations.

Another important and unique characteristic of the logic alphabet of this invention is that each of the symbols has transformational facility. Logical operations are performed automatically because, unlike the currently used systems of PWR, Polish, and McCulloch, the physical operation of flipping and rotating acts upon the letter-shapes themselves. As a result, also unlike the PWR, Polish, and McCulloch systems, the transformational facility of this invention not only reduces significantly the need for abstract rules but also, when performing logical operations, greatly simplifies the nature of these rules.

In accordance with this invention and in the same act that establishes frame consistency, each letter-shape in the logic alphabet is assigned its logical meaning by carefully relating it to an all-common basic square, one that usually remains unwritten, but even more important, one that is always retained at the mental level. In contrast, the PWR and Polish systems employ no such frame of meaning, and the X-frame in the McCulloch system is not retained at the mental level but, instead, must be written each time a symbol is used. As described below, as other features will show, the unwritten, mental square constitutes a fundamental part of the logic alphabet of this invention.

In addition, to facilitate understanding of the deep commonalities between logic and mathematics, it is a feature of this invention to adapt the unwritten, mental square so that it contains the traditional order assigned to the x-y co-ordinates of analytic geometry. To accomplish this in the logic alphabet of this invention, the TT, TF, FT, and FF compartments of an ordinary Venn diagram are contracted to the smallest possible size, namely, set-regions reduced to the size of points, which thereby establishes the limit case of state space reduction. Next, treated as elements having point set size, the corners of the frame-consistent basic square are coded to represent the entries in the ordinary truth table for two sentences (TT, TF, FT, FF), that is, coded so that they are placed in Cartesian order. Thus, in the same act that establishes not only frame consistency but also iconicity and eusymmetry, the patterns of true and false at the four coded corners are arranged to match the patterns of plus and minus in the four quadrants of the x-y axes, as typically employed in analytic geometry.

The logic alphabet of this invention has a good think-write ratio. This condition follows from the way in which the above described features are combined with the delicate balance contributed by the mental role and the unwritten aspect of the all-common basic square. On the one hand, unlike prior notations that expect the user to think too much, such as the PWR and Polish systems, an operator employing the logic alphabet can avoid many unnecessary, abstract mental manipulations and the memory work that goes with them. On the other hand, unlike prior notations that expect the user to write too much, such as the McCulloch system, the operator does not engage in unnecessary, repetitious work-writing of the all-common reference frame when employing the new symbols. Consequently, for each symbol of the logic alphabet of this invention, as it participates in the good think-write ratio, the basic square in thought on the one hand and the minimal letter-shape in writing on the other are evenly weighted and greatly reduced man-sign components of the total symbolic act-process.

A consequence of the several features of this invention is that the logic alphabet, unlike the PWR and McCulloch systems, has typographical potential. This statement is conservative: twelve of the sixteen lower-case letter-shapes are already included on the ordinary keyboard of a standard typewriter. Adding only four symbols to the keyboard makes the logic alphabet, like the Polish system, completely typographical. These symbols ( ɔ , ᴘ ,d̄ , ʮ ), old shapes in new positions, are obtained when the c-letter is flipped from left to right and when the h-letter is flipped both ways and rotated through a half-turn.

Another consequence of the several features of this invention relates to the use of parentheses. As a matter of prior practice, the PWR system is parenthesis-bound and the Polish system is parenthesis-free. In contrast, in keeping with the mental economy of the moment, the logic alphabet of this invention can be used with or without parentheses, even in a mixed way, if the operator so chooses.

Furthermore, a unique and important advantage of the logic alphabet as a notational system, in accordance with this invention, is that it facilitates the use of a large family of physical embodiments or models that can be employed in computing, teaching, and demonstrating standard logical operations. Finally, exceptional far beyond the prior notational systems discussed above, the physical embodiments of this invention can be displayed with great clarity, both visually and tactually, thereby not only fostering learning at the sensorimotor level but also making explicit in an elegant and aesthetic manner the underlying structures that inhabit elementary symbolic logic.

In summary, in reference to the sixteen binary connectives, the logic alphabet of this invention is a unique notation that has a systematically pursued and a carefully combined set of special properties. It is complete, geometric, and phonetic; it has iconicity, frame consistency, and eusymmetry; its unwritten, mental basic square is placed in Cartesian orientation; it is based on lower-case letter-shapes that are symmetry positional. It has transformational facility, typographical potential, and a good think-write ratio; if preferred, it is parenthesis-free. It consists of a society of symbols for which manipulatory structure has been designed to reflect logical structure. Especially, as a primary consequence of the foregoing, it easily lends itself to the construction of a large family of physical models which in turn reflect both the matching manipulatory structure and the underlying logical structure.

The following TABLE I is a comparison of the major ways of expressing the sixteen binary connectives, including the three above-noted prior systems and the Logic Alphabet of this invention.

FIG. 2 shows two examples of how the internal code of the logic alphabet is used to represent the common binary connectives "and" and "or";

FIG. 3 illustrates the sixteen binary letters of the logic alphabet when they are placed in a clock-compass arrangement;

FIG. 4 is an illustration of binary letters placed on movable chips, showing how combinations of A-negation and B-negation are performed by the manipulation of the chips;

FIG. 5a is an illustration of two examples that show how the logical operation of complementation, also called counterchange, is applied to a binary letter;

FIG. 5b is another illustration of binary letters placed on movable chips, showing how complementation along with A-negation and B-negation is performed by the manipulation of the chips;

TABLE I

| No. | Truth Table | In Words | PWR | Polish | McCulloch | Logic Alphabet |
|---|---|---|---|---|---|---|
| 1 | FFFF | Contradiction | Contradiction | O | ✕ | o |
| 2 | FFFT | Not-A and Not-B | ∼ A · ∼ B | X | ✺ | p |
| 3 | FFTF | Not-A and B | ∼ A · B | M | ✺ | b |
| 4 | FTFF | A and Not-B | A · ∼ B | L | ✺ | q |
| 5 | TFFF | A and B | A · B | K | ✺ | d |
| 6 | TTFF | A | A | I | ✺ | c |
| 7 | TFTF | B | B | H | ✺ | u |
| 8 | TFFT | A equivalent B | A ≡ B | E | ✺ | s |
| 9 | FTTF | A or else B | A ∧ B | J | ✺ | z |
| 10 | FTFT | Not-B | ∼ B | G | ✺ | n |
| 11 | FFTT | Not-A | ∼ A | F | ✺ | ɔ |
| 12 | FTTT | Not-A or Not-B | A/B | D | ✺ | h |
| 13 | TFTT | if A, then B | A ⊃ B | C | ✺ | p |
| 14 | TTFT | if B, then A | B ⊃ A | B | ✺ | d |
| 15 | TTTF | A or B | A ∨ B | A | ✺ | u |
| 16 | TTTT | Tautology | Tautology | V | ✺ | x |

EXEMPLARY EMBODIMENTS

Figure 8A:
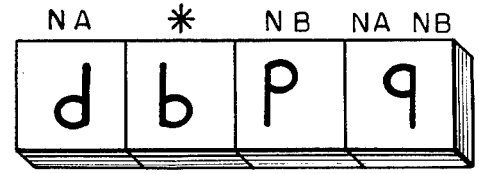
FIG. 8a is an illustration of a four-cell composite chip, wherein the same cells appear such as is shown in FIG. 6 and wherein the binary letters are arranged side by side in a rectangle.
Figure 8B:
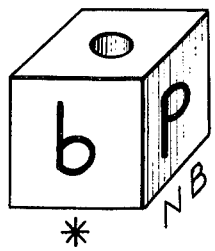
FIG. 8b is an illustration of a four-cell cube-chip wherein the rectangle in FIG. 8a is wrapped around the four sides of a movable cube.
Figure 8C:
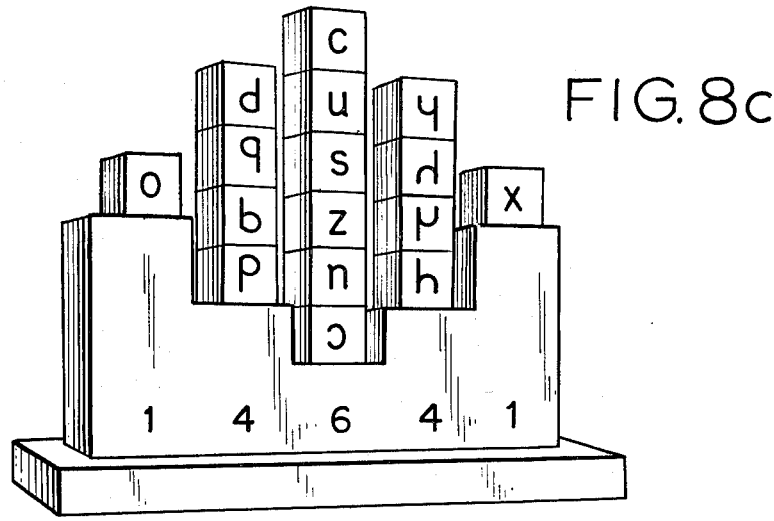
Figure 10A:
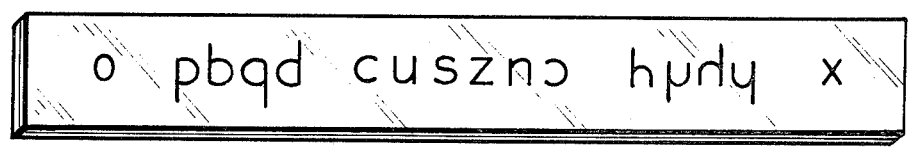
Figure 10B:
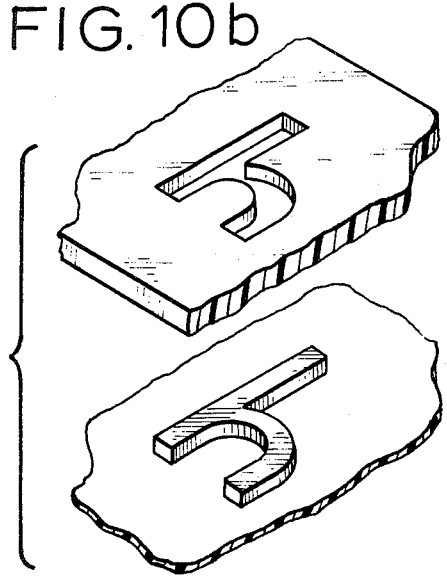
Figure 11:
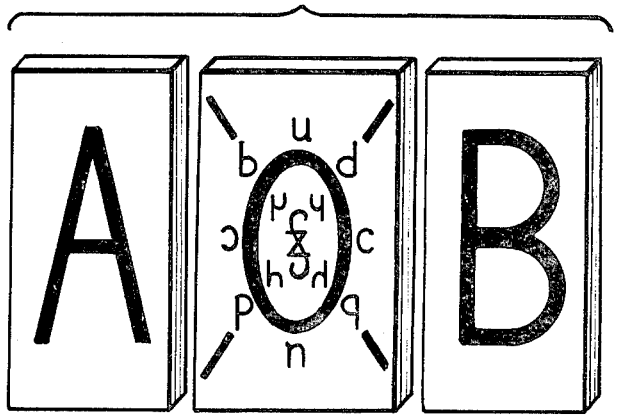
Figure 9A:
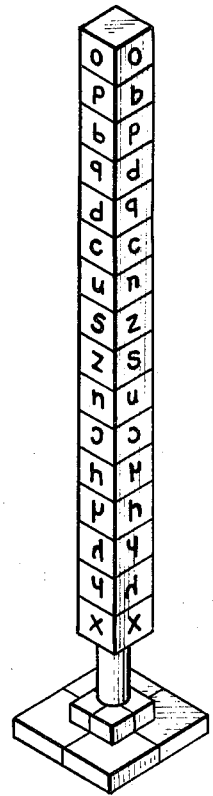
Figure 9B:
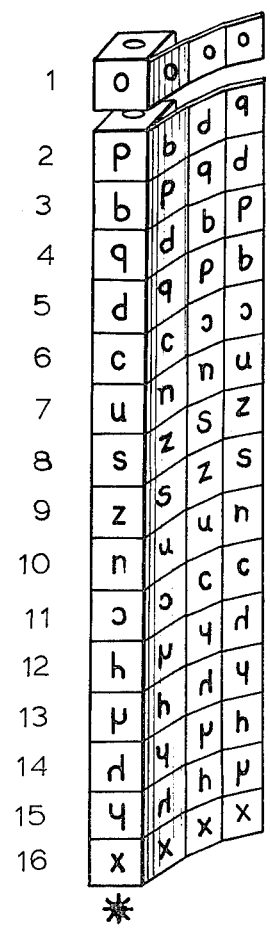
Figure 12:
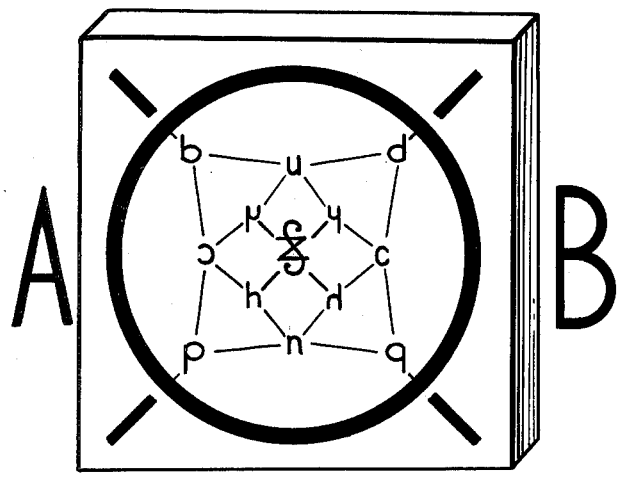
Figure 14A:
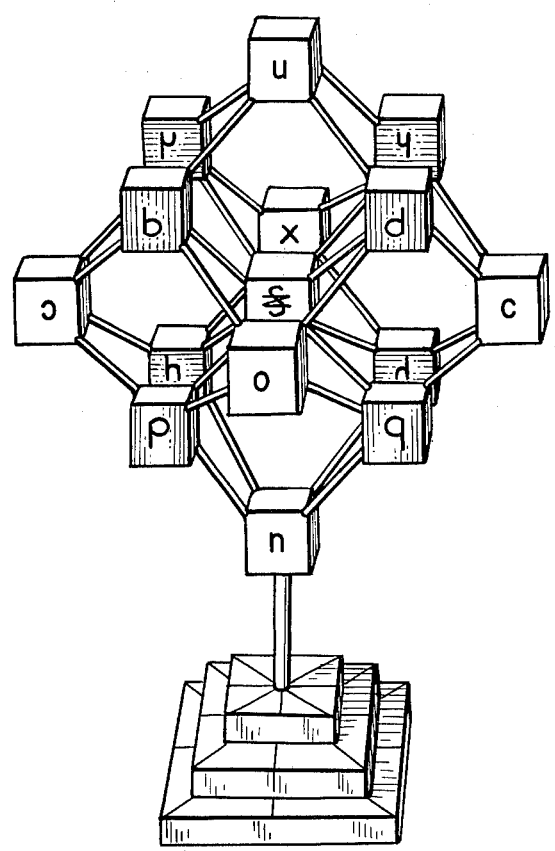
Figure 13:
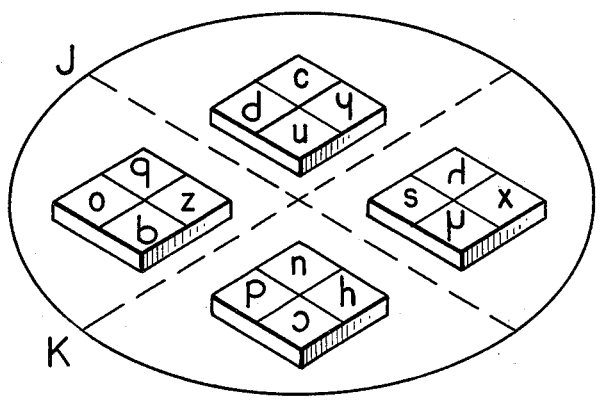
Figure 14B:
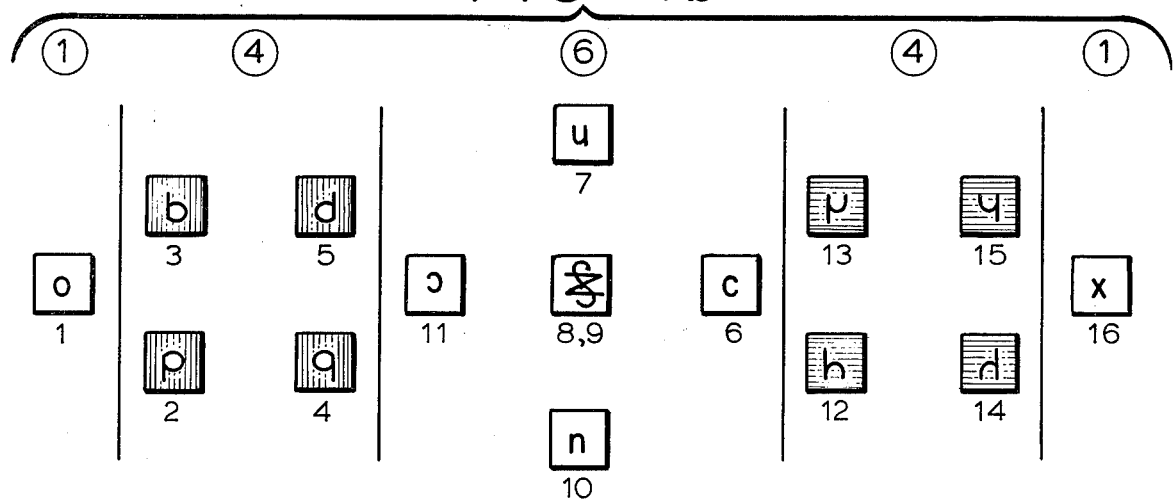
Figure 14C:
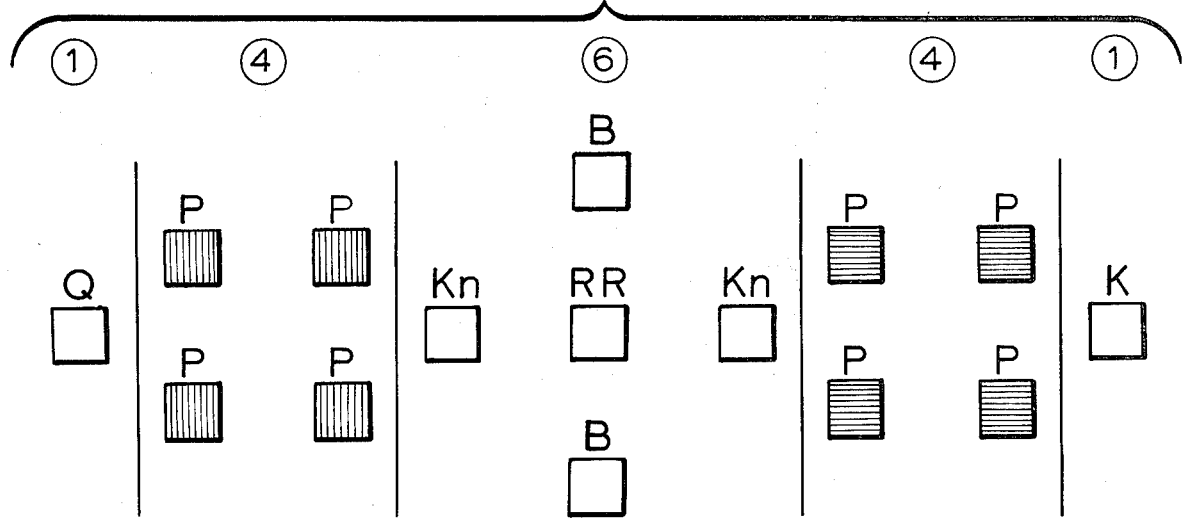
Figure 15:
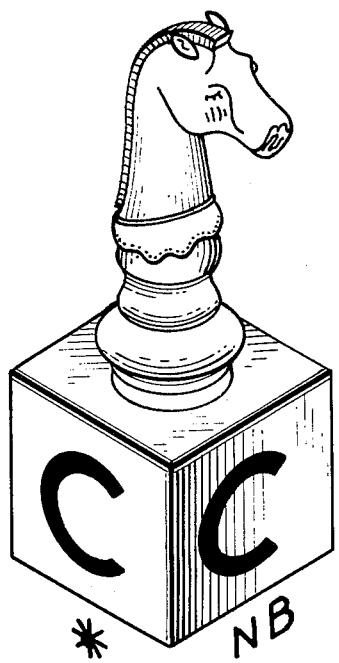
Figure 16:
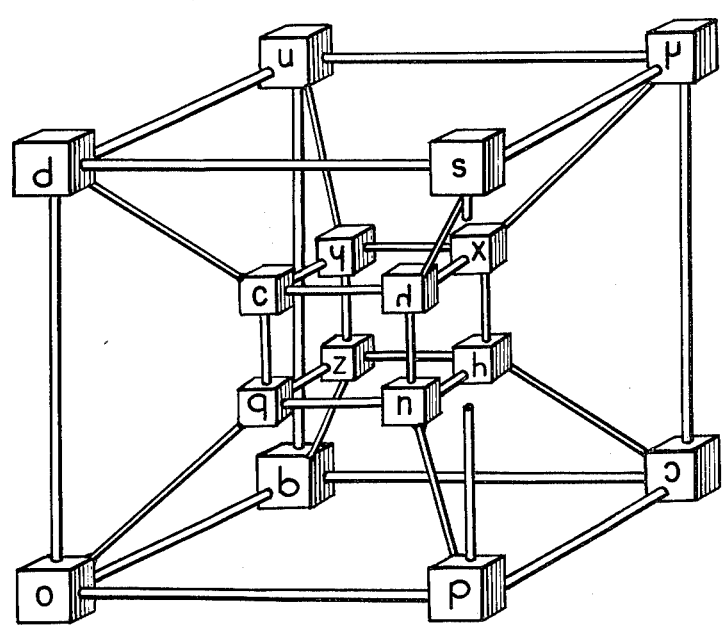
Figure 17:
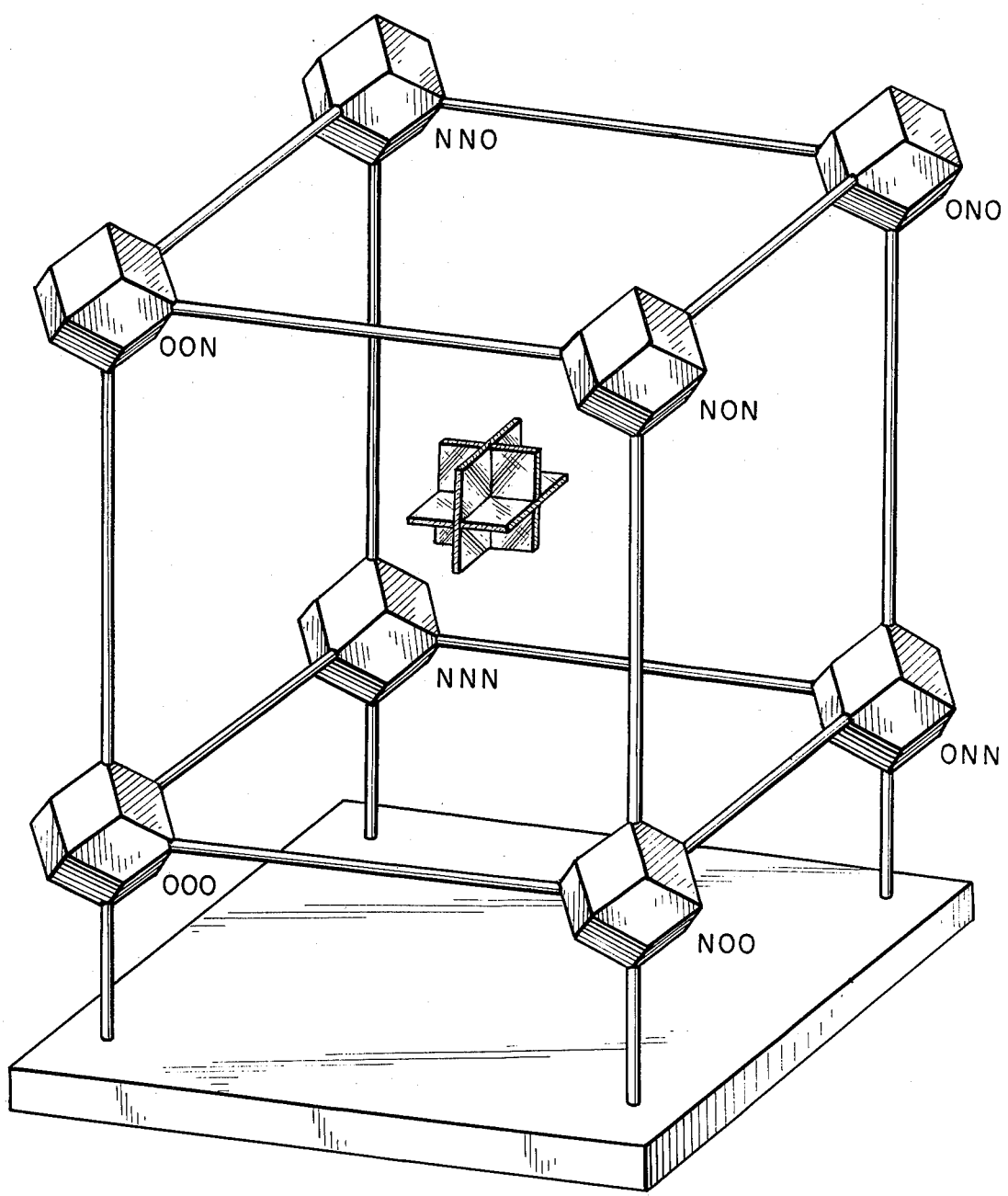
Figure 18:
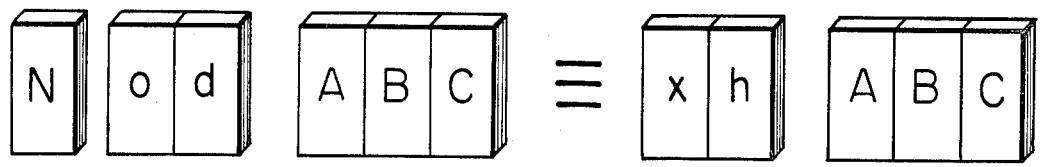
Figure 19:
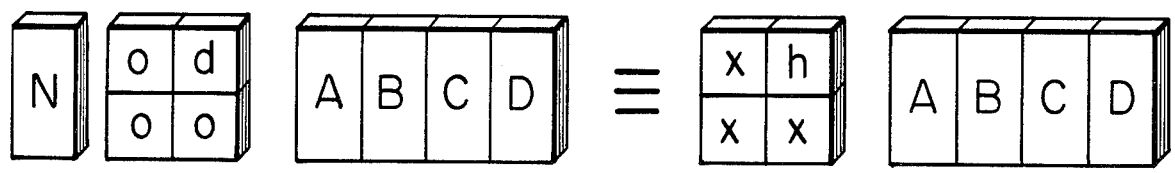

Further objects and features of this invention will become apparent from a review of several embodiments thereof taken in conjunction with the accompanying drawings in which:

FIG. 1a is an illustration of the all-common basic square that contains the external code for the (T,F)-valued logic of (A,B) sentences;

FIG. 1b is an illustration of a binary letter, the d-letter, when it is placed on the basic square and when it is related to the external code;

FIG. 8c illustrates how the binary letters are stacked into five subsets, called binomial sub-towers, each sub-tower containing those cube-chips, separate or joined, for which the binary letters have an equal number of stems;

FIGS. 9a and 9b illustrate a vertical arrangement of the logic alphabet, called a logic tower, which may be contructed, among several possibilities, from separate cube-chips such as is shown in FIG. 8b, from cube-joined sub-towers such as is shown in FIG. 8c, or from a single piece of material;

FIG. 10a illustrates a horizontal arrangement of the logic alphabet, called a flip stick, which is constructed from material that is movable and preferably transparent;

FIG. 10b is an illustration of a portion of a horizontal arrangement of the logic alphabet, called a logic alphabet board, which is provided with movable and replaceable blocks in the shape of binary letters;

FIG. 11 is an illustration of a symmetrical arrangement of the logic alphabet, called a logic bug, which is constructed as a single and movable composite chip of all sixteen binary letters;

FIG. 12 is an illustration of another symmetrical arrangement of the logic alphabet, called a polar network, which is also constructed as a single and movable composite chip of all sixteen binary letters;

FIG. 13 is an illustration of a four-block arrangement of the logic alphabet, called a stem-count finder, in which the blocks are moved to give immediate visual access to the binomial pattern of stem changes (1 4 6 4 1) by which each binary letter differs from the other binary letters;

FIG. 14a is an illustration of a unique arrangement of the binary connectives, called a logical garnet, for which the binary letters are placed at the vertices of a shadow rhombic dodecahedron, otherwise conceived of as a 4-dimensional cube that has been compressed into a 3-dimensional space;

FIG. 14b is an illustration of the binomial (1 4 6 4 1) and symmetrical arrangement of the binary letters that is obtained when, starting with the o-vertex placed in front and viewed in polar perspective, the logical garnet in FIG. 14a is subjected to five vertical cross-sections that are successively placed one behind the other;

FIG. 14c is an illustration of the same sequence of cross-sections obtained in FIG. 14b, but in which a set of chess pieces has been substituted for the binary letters, and for which the chess-set correspondence in kind and in frequency matches exactly the symbols of the logic alphabet;

FIG. 15 is an illustration of one member in a set of special chess pieces, called a knight cube-chip, with its base portion such as is shown in FIG. 8b, with its chess-piece portion such as is specified in FIG. 14c, and with its placement in the rhombic dodecahedron such that it is stationed at the c-letter vertex located at the far right in FIG. 14a and at Position 6 in FIG. 14b;

FIG. 16 is an illustration of a 3-dimensional model of a 4-dimensional cube, also called a tesseract, with vertices that are occupied by a set of cube-chips, one for each binary letter, such as are shown in FIG. 8b or 8c;

FIG. 17 is an illustration of an eight-cell arrangement of logical garnets, wherein the logical garnet in FIG. 14a is first placed in the near lower-left octant (OOO) and then it is kaleidoscopically acted upon by three mutually perpendicular mirrors, thereby showing in one view the manner in which the eight combinations of negation operate on all sixteen binary letters of the logic alphabet;

FIG. 18 is an illustration of ternary connectives placed on movable chips, showing how the scope of the logic alphabet is extended so that side-by-side pairs of binary chips are used to obtain ternary chips for three sentences (A,B,C), and for which the xh-pair is the counterchange mate of the od-pair;

FIG. 19 is an illustration of quaternary connectives placed on movable chips, showing how two pairs of side-by-side binary chips, or how one pair of one-above-the-other ternary chips, are used to obtain quaternary chips for four sentences (A,B,C,D), and for which the quadruplet on the right (xxxh) is the counterchange mate of the one on the left (oood).

Sixteen Binary Letters

The logic alphabet of this invention is a special set of symbols that are used to represent the sixteen binary connectives. Now an ordinary part of modern symbolic logic, these sixteen connectives are a fundamental part of the logic of sentences, also called the propositional calculus. The symbols of the logic alphabet are listed in the last column of TABLE I, as is shown above. These symbols are called binary letters, one each for the sixteen binary connectives. The shapes of all of the binary letters have been carefully selected from the lower-case letters of the English alphabet. Twelve of these letter-shapes have phonetic values that are the same as those used in ordinary reading. The other four of these letter-shapes ( ɔ, ᖾ, ᴅ, ɥ ) have positions that are different from those used in ordinary print and, therefore, have been assigned their own phonetic values.

The logical meaning assigned to each binary letter is determined by two codes, one external and the other internal. The external code is assigned to the four corners of a basic square, as is shown in FIG. 1a. More specifically, the truth table for two sentences (TT, TF, FT, FF) is assigned to the four corners of the basic square, thereby serving as the meaningful parts of a mental frame of reference.

The basic square is always retained at the mental level and, used in this way except for purposes of illustration, it remains unwritten when logical operations are expressed. Furthermore, the two mirror planes ($m_A$ and $m_B$) in FIG. 1a have been included to function as the symmetry elements that will activate a system of flips and rotations. These symmetry elements are represented by lines that cut across the basic square. The position of these lines shows that the vertical and horizontal axes of the basic square coincide with the x-y coordinates commonly used in analytic geometry. By this arrangement, the four corners of the basic square reside in the four quadrants of the Cartesian coordinate system; more specifically, they reside on the diagonal axes that cut through and that bisect the four quadrants. This arrangement is the basis from which the patterns of true and false are externally coded to match the patterns of plus and minus.

Each binary letter consists of an arrangement of stems that number from zero at the least to four at the most. These stems, in reference to their positions, are always located in close proximity to the coded corners of the basic square. Assigned to these stems is the internal code that determines the logical meaning given to each symbol.

Two simple images will show how a unified code is obtained from the external and the internal codes of the new symbolism. First, as is given in FIG. 1a, the truth table for two sentences (TT, TF, FT, FF) is externally assigned to the four corners of the basic square. Second, the four stems (TTTT) of the lower-case x-letter of the logic alphabet, as is given in TABLE I, are internally extended, like arms and legs, until they reach into the corners of the basic square. According to this unified code, when the x-letter is framed against the basic square (TT, TF, FT, FF), it is a stem-determined abbreviation for its truth table (TTTT) and is, therefore, the symbol for tautology (A×B). Consequently, no matter how the x-letter is flipped and half-turned within the basic square, and no matter in what sequence it performs these movements, it will always come to rest with its four stems located in close proximity to the four corners of the basic square. At the other extreme, as is also given in TABLE I, the o-letter of the logic alphabet has no stems at all (FFFF); it is the symbol for contradiction (A o B).

Another example of what happens when a binary letter is placed into the space occupied by the unwritten, mental square is shown in FIG. 1b. As is seen therein, the d-letter of the logic alphabet has one stem (TFFF) in the upper-right corner (TT) of the basic square; it is the symbol for the and-connective, also called conjunction (A d B). In an effort to attain extreme simplicity of expression, the first line of FIG. 2 also shows how the d-letter, when given its logical meaning, is related both externally to the all-common basic square and internally to the corresponding truth table. Following the same format, the second line of FIG. 2 shows how the three stems (TTTF) of the ɥ-letter of the logic alphabet are used to stand for the or-connective, also called disjunction (A ɥ B).

All of the possible combinations of stems, exactly sixteen, have been built into the binary letters. That is to say, these stem combinations are an inherent part of the letter-shapes. Therefore, these combinations are also shown in the last column of TABLE I, and in FIG. 8c, where by stem frequency (0 1 2 3 4) and by symbol incidence (1 4 6 4 1) they have been placed in binomial order. Eight (- 4 - 4 -) of the binary letters (p b q d h p d ɥ) are called tall letters; like a flagpole, each of these odd-stemmed symbols is pulled long in the up-down direction. The other eight (1 - 6 - 1) of the binary letters (o c u s z n ɔ x) are called squat letters; like a box, each of these even-stemmed symbols is pushed both ways into a compact space. The iconicity of each binary letter is determined by the number of stems, one each for the incidence of T's in its truth table. The eusymmetry of each binary letter is determined by the positions of the stems, always located in close proximity to the corners of the basic square. It is the all-common basic square that provides each binary letter of the logic alphabet with frame consistency.

FIG. 3 shows a special arrangement of the sixteen symbols of the logic alphabet of this invention. The same unified code, as already described for FIG. 2, has been used to place each of the sixteen binary letters in its corresponding basic square. As a convenience for display purposes, the bold dots in FIG. 3 stand for the incidence of T's in the corresponding truth table for each binary letter (see TABLE I). A further feature of the arrangement shown in FIG. 3 is that the sixteen stations for the binary letters are associated with the positions of a clock-compass, the encircled numbers 1 through 12 indicating the clock positions, and the encircled letters N, E, W, and S representing the compass positions.

Another look at the bold dots shown in FIG. 3 gives further emphasis to the special way in which the logic alphabet of this invention makes use of the ordinary letter-shapes that are already a part of the English alphabet. The unified code prescribes that each stem-tip on the internal side must be close to a bold dot on the external side. It follows that each binary letter is a "topological cursive;" in other words, topological because proximity relations of the stem-tips are the means by which the symbols are given their logical meaning, and cursive because the symbols, all except the x-letter, are written by means of one, short motion of the pen. From this point of view, again in reference to the bold dots and the stem-tips close to them, the logic alphabet is a special set of stem-tip icons.

Sixteen Binary Chips

The logic alphabet of this invention is embodied in a special set of manipulatory chips, one each for the sixteen binary letters. Each chip along with the binary letter on it is called a binary chip.

Binary chips can be made from any suitable material, such as plastic, wood, ceramic, or the like. They may be transparent; if opaque, they may be printed upon, painted, engraved, or otherwise marked so that the letter-shapes will be clearly noticeable from both sides. They may be solid, grooved to match from both sides, cut all the way through, or whatever favors the ease of displaying the letter-shapes. A suitable transparent chip would, for instance, be constructed by placing a printed binary letter between two sheets of laminated plastic material. By using the same example shown in the first line of FIG. 2, the letter-shape for the and-connective is repeated in chip form in the lower-left rectangle of FIG. 4. As is seen therein, a separate and movable d-chip is placed between an A-chip and a B-chip, also separate and movable.

Negation and the Binary Chips

A chief advantage of the logic alphabet of this invention is the ease with which the logical operation of negation acts upon the system of manipulatory chips. Behind all of this is total adherence to one key idea, when it is systematically applied to designing a notation that is phonetic-iconic. The key idea is to treat negation as a transformational mirror, one for which a binary letter is flipped, or reflected 180 degrees, every time one of the two sentences (A,B) is acted upon by negation. Giving rise to transformational facility as its best, in fact, almost an invitation to lazy logic, this key idea becomes one of the primary sources from which to construct a notation that is symmetry positional.

The main emphasis in FIG. 4 is to give an example of how the system of manipulatory chips can be used to display and to perform the logical operation of negation. In what follows, the letter N stands for (N)egation, and the asterisk is an algebraic symbol that stands for any one of the sixteen binary letters. Fundamentally, there are four combinations in which negation can be applied to two sentences (A,B), as follows: (1) negate neither, (A * B); (2) negate A, (NA * B); (3) negate B, (A * NB); and (4) negate both, (NA * NB). The last three of these combinations, likewise labelled with N-letters, are shown in FIG. 4 by the arrows that pass from one rectangle to another. These arrows activate specific rules for which a manipulatory chip, along with the letter-shape on it, is flipped and rotated.

The manipulatory rules that go with the four combinations of negation will be demonstrated for the d-chip. This example (A d B) continues with what is given in the first line of FIG. 2 and with what is repeated in the lower-left rectangle of FIG. 4. Rule One: when neither the A-chip nor the B-chip is negated (A d B), the d-chip is subjected to the Identity operation; that is, it remains in place, stationary and unchanged. Rule Two: when the A-chip alone is negated (NA d B), the d-chip is flipped from left to right, thereby changing the d-chip into a b-chip, as is shown in the lower-right rectangle of FIG. 4. Rule Three: when the B-chip alone is negated (A d NB), the d-chip is flipped from top to bottom, thereby changing the d-chip into a q-chip, as is shown in the upper-left rectangle of FIG. 4. Rule Four: when both the A-chip and the B-chip are negated (NA d NB), the d-chip is flipped both ways in either order, or what amounts to the same thing, it is rotated a half turn of 180 degrees in the horizontal plane, thereby changing the d-chip into a p-chip, as is shown in the upper-right rectangle of FIG. 4. In keeping with these manipulatory rules, the d-chip of this example has been subjected successively to no change, a left-right flip, an up-down flip, and a half-turn rotation.

In like manner, the same manipulatory rules can be applied uniformly to all of the binary letters. One requirement is that the corresponding binary chips must remain in the same general orientation, never tilted sideways but always horizontal like a box resting on the ground, in every case such as is shown in FIG. 3. When this condition is maintained, every one of the binary chips can be meaningfully subjected to no change, a left-right flip, an up-down flip, and a half-turn rotation. In this way the above-identified combinations of negation act upon the logic alphabet of this invention.

Complementation and the Binary Chips

Complementation is a special case of negation. In this case the scope of negation is extended so that, instead of acting on either of the sentences (A,B), it acts on the binary connective itself, as represented by its binary letter. Negating any binary letter, that is, the directive to find its complement, is shown by placing the letter N next to the asterisk itself, as in the expression (A N* B). When the (N*)-operation is applied to the system of manipulatory chips, additional rules are generated for the logic alphabet of this invention.

FIG. 5a illustrates the manner in which the logic alphabet is used to perform the (N*)-operation of complementation. The complement of any binary letter (A N* B) is another binary letter (A * B), one that is obtained by counterchanging the former to yield the latter. The rule for counterchanging any binary letter is to reverse the presence and absence of its stems and, therefore, to reverse the T's and F's in its truth table (see TABLE I). For instance, the looped arrow on the left side of FIG. 5a indicates that the h-letter in (A h B) is the complement of the d-letter in (A Nd B); the four positions at (TFFF) have been counterchanged to obtain the stems for (FTTT). In like manner, the x-letter (TTTT) is the counterchange of the o-letter (FFFF). In addition, the direction of the looped arrow is reversible because the letter-shapes of the logic alphabet subdivide into complementary pairs, which in keeping with the corresponding patterns of stem reversals appear as counterchange mates.

The main emphasis in FIG. 5b is to show what happens to the same example (A d B) when the operation of counterchange is added to the four combinations of negation illustrated in FIG. 4. When counterchange is applied to the d-chip, four more combinations of negation are introduced and so are the manipulatory rules that go with them. Rule Five: when counterchange (Nd) is added to (A * B), the d-chip is exchanged for an h-chip, as is shown in the first line of FIG. 5b. Rule Six: when counterchange (Nd) is added to (NA * B), the d-chip is flipped from left to right and then it is exchanged for a d -chip, as is shown in the second line of FIG. 5b. Rule Seven: when counterchange (Nd) is added to (A * NB), and d-chip is flipped from top to bottom and then it is exchanged for a p -chip, as is shown in the third line of FIG. 5b. Rule Eight: when counterchange (Nd) is added to (NA * NB), the d-chip is flipped both ways or it is rotated, and then it is exchanged for a ɥ -chip, as is shown in the fourth line of FIG. 5b. In keeping with the four additional combinations of negation, the d-chip of this example is first subjected to Rules One, Two, Three, and Four, and then these outcomes are exchanged for the corresponding counterchange mates.

As is noted above, the four letter-shapes of the logic alphabet that are placed in new positions can be assigned their own meaningful phonetic values. Appropriate phonetic values, for instance, would be as follows. The ɥ -letter is called "yor," for "why" and "or." The p -letter is called "mif," for "mu" and "if." The ɔ -letter is called "rif," for (r)otated "if." The d -letter is called "rAy," for (r)eflected "A." By analogy, the c-letter (see TABLE I) could be called "Acke," for "A" and the k-sound of a hard c. As is evident, these phonetic values have been taken from the pool of associations contained in their ties to the history of the alphabet, to the logical meanings that need to be assigned, and to the logical operations that are being performed.

Complementary pairs of binary chips can also be specified by making use of the orderly arrangements of the logic alphabet that have already been given in TABLE I and FIG. 3. When sets of binary chips are placed in these patterns, the counterchange mate of any binary chip is located with respect to a center of symmetry. Such as in TABLE I, this center is the midpoint of the vertical column (between the sz chips); for example, the mate of the o-chip at the top of the column is the x-chip at the bottom of the column, and vice versa. Such as in FIG. 3, this center is the midpoint of the clock-compass (shown as an eight-pointed cross); for example, the mate of a d-chip at 11 o'clock is the h-chip at 5 o'clock, and vice versa. In conclusion, for arrangements of the logic alphabet such as are shown in TABLE I and FIG. 3, the (N*)-operation is reduced to the visual search for two chip mates, each symmetrically located with respect to the other.

Sub-Societies of Binary Chips

Sub-societies are manipulatory structures that match exactly the underlying algebraic structures that are an inherent part of the logic of two sentences (A,B). Consequently, these sub-societies not only govern the inter-relationships among the sixteen binary chips but also offer a clear exhibit of the transformational facility of the logic alphabet of this invention. Each sub-society contains just enough binary chips so that it is a factor of sixteen, especially the factors two, four, and eight. Examples of these sub-societies will be described.

Each binary chip is a one-chip sub-society, an island unto itself, under the operation of Identity. Under the operation of complementation, there are eight pairs of two-chip sub-socities. These are the same pairs of counterchange mates, described above, that are symmetrically situated with respect to the midpoint of the last column of TABLE I and the midpoint of the clock-compass in FIG. 3.

As is well-known to anyone skilled in the fundamentals of abstract algebra, particularly group theory, the pattern of changes underlying a four-chip sub-society is called a Klein 4-group. The nature of a Klein 4-group is also described in F. J. Budden's book entitled "The Fascination of Groups" (Cambridge University Press, London, 1972, Pages 139 and 149).

Two examples, among others, will demonstrate the transformational existence of four-chip sub-societies. The first example is mostly a repeat of FIG. 4 when it is looked at in a broader context. The added consideration shows that it is not necessary to start with the d-chip in the lower-left rectangle. Instead, it is possible to start from any rectangle and then, by applying the first four manipulatory rules of negation, to follow the arrows to the other three rectangles. That is to say, precisely these four manipulatory rules acting on the binary chips p, b, q, and d will generate a sub-society of transformations so that any one of the four chips is converted into itself (Identity) and the other three. In effect, the test for a sub-society is the convertibility of all of its chips into each other—under the same set of operations. The second example of a four-chip sub-society is obtained when the binary chips (h p d u) at the right side of FIG. 5b are also subjected to the first four manipulatory rules of negation.

The transformational facility of the logic alphabet of this invention also makes it possible to identify an eight-cell sub-society. This larger sub-society consists of the binary chips contained in both FIGS. 4 and 5b. These binary chips (p b q d h p d u) are the tall-letter chips that constitute the odd-stemmed half of the logic alphabet. When the eight manipulatory rules of negation act upon the eight tall-letter chips, they generate an 8-group of logical transformations. In other words, by way of negation any tall-letter chip can be defined in terms of any other tall-letter chip. That is to say, using the eight manipulatory rules makes it possible to convert any tall-letter chip into any other tall-letter chip, such being the system of interconnections, or arrows that connect, all of the symbols with each other in this special and larger sub-society of binary chips. It is worth noting that the same 8-group of transformations, still in reference to the tall-letter chips, is also activated as a subset that resides at the vertices of the cube-cores that occupy the eight logical garnets that are shown in FIG. 17.

Binary Chips for the 128 Basic Transformations

A summary of the system of manipulatory chips to the extent that it has been described above is contained in the series of numbers 3, 8, 16, 64, and 128. Indicating how this series of numbers is obtained will further reveal the compact simplicity and at the same time the transformational comprehensiveness of the logic alphabet of this invention.

Three reduces to a minimum the number of basic changes, that is, the primitive operations, that are strong enough to generate the system of manipulatory chips. These primitive operations, the same as Rules Two, Five, and Three, described above, are as follows: left-right flip for (NA * B); counterchange for (A N* B); and up-down flip for (A * NB). These primitive operations, always given in the same order as a triplet, may be expressed in several ways: in symbols as (NA, N*, NB); with words added as NA-flip, (N*)-counterchange, NB-flip; or simply, as flip, counterchange, flip. Hereinafter this triplet will be referred to as flip-mate-flip.

Eight is the number of manipulatory rules that are obtained from all combinations of flip-mate-flip. For purposes of convenience, a compact code for these rules will be established. An upper-case O-symbol will stand for the ABSENCE of negation (not to be confused with the lower-case binary o-letter); as before, the letter N will stand for the PRESENCE of negation. Rule One was given for (A * B), which is now expressed as (OA O* OB), or more compactly, as the triplet OOO. Rule Eight was given for (NA N* NB), which as another example is now reduced to NNN. In keeping with the flip-mate-flip operations described above, the left N is for A-negation, the middle N is for counterchange, and the right N is for B-negation. When this code is applied to all combinations of flip-mate-flip, the eight rules of negation reappear in terms of the following triplets: (1) OOO, (2) NOO, (3) OON, (4) NON; (5) ONO, (6) NNO, (7) ONN, and (8) NNN. This code will be used below; for example, as is shown in FIG. 17. It should be noted that the four triplets before the semicolon are without complementation (-O-) and the other four triplets include it (-N-).

The numbers 16, 64, and 128 are obtained in the following manner. A complete table of transformations is constructed from two half-tables. The first half-table is generated when the 16 binary chips are acted upon by the first four triplets of flip-mate-flip (without complementation). This half-table contains 64 basic transformations that are shown in the four columns of FIG. 9b. The second half-table is generated when the 16 binary chips are acted upon by the other four manipulatory triplets (with complementation). This half-table of 64 basic transformations is also shown in the same four columns of FIG. 9b, but this time these columns are taken in reverse order. The complete table of transformations, arranged in 16 rows and 8 columns that contain 128 binary chips, is likewise compressed into the four columns of FIG. 9b; the four columns going down omit complementation and the same four going up include it. The complete table of 128 basic transformations shows that the system of manipulatory chips is exact and analytic.

In summary, the logic alphabet of this invention has been designed so that the same manipulatory rules for flip-mate-flip can be uniformly applied to each of the binary chips—one at a time, in any combination, or all at once. It is this condition that makes it possible to generate a large family of physical models, only some of which are illustrated in the following drawings. These embodiments, as expected, will repeatedly call attention to the 128 basic transformations that are generated by flip-mate-flip. Of course, it will be appreciated that the logic alphabet is not limited to this particular set of transformations.

Composite Chips

The binary chips of this invention may also become the parts and pieces of several arrangements that are compact, meaningful, and very helpful, both to use and to learn about the two-valued logic of two sentences. No matter how joined or separate are the components therein, these arrangements are called composite chips. All of the embodiments that follow belong to composite chips. The simple forms are given directly below. After that, the more elaborate forms will be described in separate subsections.

Figure 6:
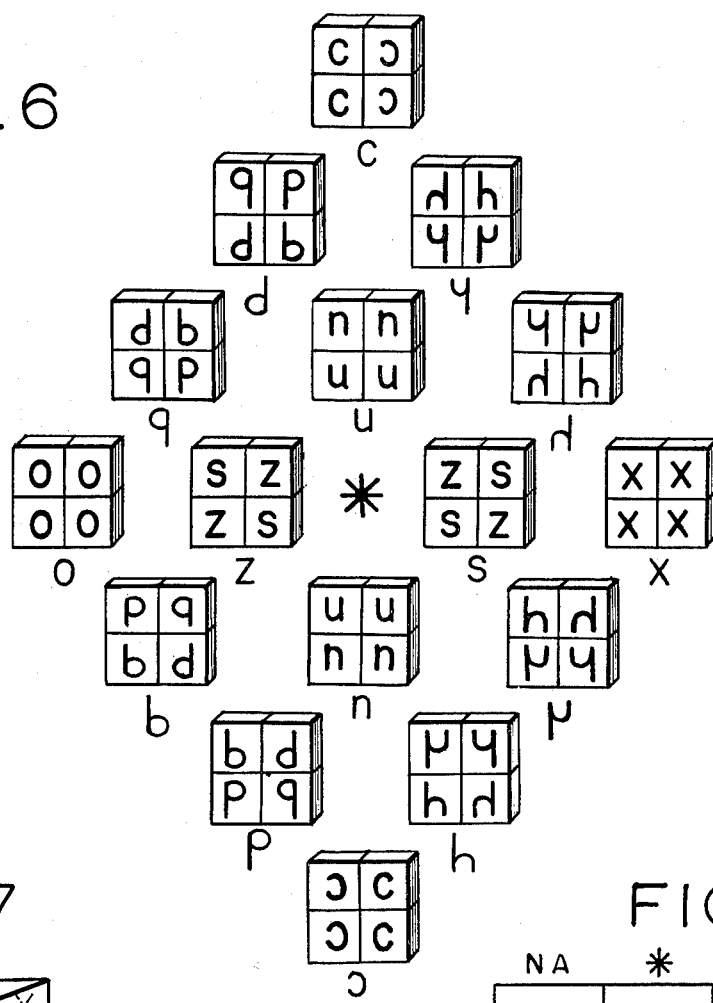
FIG. 6 is an illustration in which four-cell composite chips, one for each binary letter, have been placed in a clock-compass arrangement, and for which the chip cells are used to perform the logical operations of Identity, A-negation, B-negation, and (A,B)-negation.

Composite chips are built to favor three extremes. First, such as is shown in FIG. 8b, they embody the patterns of logical operations in which the binary chips participate. Second, such as is shown in FIG. 6, they embody the symmetry properties that are an inherent part of the letter-shapes themselves. Also, such as are shown in FIGS. 10a and 10b, a few mixtures of these two extremes will be included. Third, both the logical patterns and the symmetry properties are embodied in the same model so that, as a two-way unity, they are isomorphically incorporated into a single structure. This third kind, particularly the logical garnets such as are shown in FIGS. 14a and 17, will be given special attention.

Two-cell composite chips are not included in the drawings. They are constructed from pairs of binary chips that contain counterchange mates. Eight pairs of them are obtained when the bottom half of the last column of TABLE I is bent around to match the top half. The binary chips in these pairs may be separate or joined, as when an o-chip and a x-chip are pushed together so that they have a common edge across the middle or down the middle.

Four-cell composite chips are shown in FIG. 6. These chips are used to illustrate, to display, or to allow performance of the operation of negation, when the first four combinations of flip-mate-flip (without complementation) act upon all of the binary chips of this invention. The routine is as follows. Rule One for Identity (OOO) leaves each binary letter unchanged, as is shown in the lower-left quadrant of each four-cell chip. Rule Two for A-negation (NOO) flips each binary letter into the lower-right quadrant of each four-cell chip. Rule Three for B-negation (OON) flips each binary letter into the upper-left quadrant of each four-cell chip. Rule Four for (A,B)-negation (NON) rotates each binary letter into the upper-right quadrant of each four-cell chip. When these four combinations of flip-mate-flip are applied simultaneously to all of the binary letters, a clock-compass arrangement of one-cell chips, such as is shown in FIG. 3, is converted into a clock-compass arrangement of four-cell composite chips, such as is shown in FIG. 6.

For example, again calling attention to the Klein-group sub-society of binary chips such as is shown in FIG. 4, the p-letter at 7 o'clock in FIG. 6 yields a four-cell composite chip by respectively remaining a p-chip, flipping into a q-chip, flipping into a b-chip, and rotating into a d-chip. In like manner, the first four combinations of flip-mate-flip acting upon the sixteen binary chips embody the half-table of 64 basic transformations that are shown in the four columns of FIG. 9b.

Another model of a four-cell composite chip, one with components in a different arrangement, is illustrated in FIG. 8a. In this case, after applying the first four rules of negation to the b-letter, the resulting binary chips are placed in a rectangle. In like manner, such a rectangle of four-cell chips can be obtained for all of the binary letters of this invention. When this is done, the same four columns in the half-table of 64 basic transformations, such as is shown in FIG. 9b, are arranged from left to right so that the last column of FIG. 9b is shifted to the position of the first chip on the left hand side of FIG. 8a.

Figure 7:
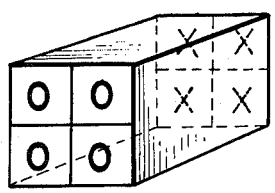
FIG. 7 is an illustration of an eight-cell composite chip (shown for the o-letter), which is generated for any binary letter by pairing those two four-cell chips in FIG. 6 that are symmetrically located either across the center or across the polar axis of the clock-compass, and which is used to perform the additional operation of complementation.

Eight-cell composite chips are obtained by making extended use of two of the four-cell panels that are shown in FIG. 6, in such a way that the eight combinations of negations are applied to the same binary letter. Not included among the drawings, these pairs of panels are also placed side by side or one above the other, again separate or joined at the common edge. Other arrangements of these pairs of panels are described in the next subsection where, such as is shown in FIG. 7, they take the shape of eight-cell cube-chips. When using a full set of sixteen, one for each binary letter, any arrangement of eight-cell composite chips is capable of embodying the complete table of 128 basic transformations.

Combinations of Cube-Chips

A cube-chip is a composite chip that is obtained when some combination of binary chips is placed on some combination of the four sides, or faces, of an ordinary cube. One-cell cube-chips, such as is shown in FIG. 8c, are marked on the front faces. Two-cell cube-chips are not included among the drawings. They are marked on the front and back faces, usually showing complementary pairs of binary letters. Rotating such a set of two-cell cube-chips, which applies to the mate pat of flip-mate-flip (ONO), carries the corresponding back faces and the counterchange mates to the front. Another rotation of this kind reinstates the original condition.

A four-cell cube-chip, such as is shown in FIG. 8b, is obtained by wrapping the rectangle of binary chips in FIG. 8a around the four sides of a cube. A set of cube chips of this kind can be adapted to many situations, only a few of which will be mentioned. Such cube-chips, for instance, could appear as blocks hanging in a crib, as beads on a bracelet, as the parts of a necklace, or the like, for decorative or display purposes. Other examples, such as are shown in FIGS. 8c, 9a, 14a, 15, 16, and 17, emphasize the computing the teaching features of these cube-chips.

An eight-cell cube-chip is an arrangement that follows from having all combinations of flip-mate-flip act upon the same binary letter of this invention. For example, the eight-cell cube-chip that is shown in FIG. 7 is obtained when the eight rules of negation are applied to the o-letter. In this case, the first four rules (without complementation) yield four o-letters and the next four rules (with complementation) subjoin four x-letters; both sets of four are oriented such as is shown in FIG. 7. In like manner, a full set of eight-cell cube-chips, one for each binary letter, can be placed at the stations of a clock-compass arrangement such as are shown in FIGS. 3 and 6. When this is done, as mentioned above, any arrangement of eight-cell composite chips, in this case, cube-chips, is capable of embodying the complete table of 128 basic transformations.

Eight-cell cube-chips, one for each binary letter, can also be obtained directly from larger components by carefully selecting two-panel combinations from a full set of four-cell composite chips (see FIG. 6). By end-on contraposition, such as is shown in FIG. 7, the two panels become the front and back faces of a cube-chip, thereby making it unnecessary to apply the eight rules of negation one by one. Each pair of panels is selected in two ways, depending on the logical operation that is embodied in the front-back direction of the cube-chip such as is shown in FIG. 7.

The two ways of constructing eight-cell cube-chips are described in reference to the clock-compass arrangement given in FIG. 6. First, if the front-back direction is represented by complementation (ONO), which sends duality (NNN) through the center of the cube, the four-cell panels that are paired must be located symmetrically across the center of the clock-compass arrangement. Second, in reverse, if the front-back direction is represented by duality (NNN), which sends complementation (ONO) through the center, the panels that are paired must be located symmetrically across the polar axis. The first arrangement of the eight rules of negation is the more readily apparent from FIG. 6; the second is useful in the development of further embodiments of this invention. An example of the latter is shown in FIG. 17.

Binomial Sub-Towers

FIG. 8c illustrates how binomial sub-towers incorporate the binomial subsets (1 4 6 4 1) that constitute the logic alphabet. Among the several embodiments of this model, the cube-chips in each sub-tower may be one-cell chips, that is, displaying only one binary letter on the front face, such as is shown in FIG. 8c. The cube-chips may also have two cells (not included among the drawings), four cells such as is shown in FIG. 8b, or eight cells such as is shown in FIG. 7. The cube-chips may be separate or joined, but in either case, preferably rotatable. The cube-chips may be detachable and capable of being scrambled, before they are reassembled. In particular, the one-cell cube-chips shown in FIG. 8c have been ordered from left to right so that each sub-tower contains those binary letters (1 4 6 4 1) that have an equal number of stems (0 1 2 3 4).

Binomial sub-towers, such as is shown in FIG. 8c, are used to display and to perform logical operations. The example that follows will consider the specific model for which a set of four-cell cube-chips, such as is shown in FIG. 8b, has been stacked into the arrangement given in FIG. 8c, thereby making it possible to apply the eight combinations of negation. The physical movements that go with the first four combinations of negation are applied to all of the sub-towers as follows: (OOO), in place and unchanged; (NOO), quarter turn from the left; (OON), quarter turn from the right; and (NON), half turn in either direction. The other combinations of negation introduce complementation (ONO, NNO, ONN, NNN); counterchange mates are located symmetrically across the center of the middle sub-tower, and are therefore positioned across the center of the front of the total display.

For example, when using the model in FIG. 8c after it has been adapted to four-cell cube-chips, and when (NNN) acts on (A p B), the p-letter found at the bottom of the second sub-tower (as counted from left to right) is converted into an h-letter found on the half-turned cube-chip located at the top of the fourth sub-tower. In like manner, the complete table of 128 basic transformations is embodied in, and can be displayed and performed by, the binomial sub-towers constructed in accordance with this invention.

Logic Tower

A logic tower embodying this invention is illustrated in FIGS. 9a and 9b. This tower is preferably constructed from wrap-around cube-chips that are separate and rotatable, but it can also be made from cube-joined sub-towers, or from a single piece of material.

In regard to logical operations, the physical movements are the same as those described above (see FIG. 8c) for the binomial sub-towers: (OOO), in place and unchanged; (NOO), quarter turn from the left; (OON), quarter turn from the right; and (NON), half turn in either direction. The other combinations of negation introduce complementation (ONO, NNO, ONN, NNN); counterchange mates are located symmetrically across the up-down midpoint of the logic tower. As a convenient guide, as can be determined from the numbered positions in FIG. 9b, seventeen is always the sum of the positions of counterchange mates.

For example, when (OON) acts on (A h B), the h-letter that is found on the front face of FIG. 9b, shown at Position 12, is converted into a q-letter that is found by rotating the logic tower a quarter turn from the right and, shown at Position 5, by jumping symmetrically across the midpoint of the second column of FIG. 9b. In like manner, the complete table of 128 basic transformations is embodied in, and can be displayed and performed by, the logic tower of this invention.

Flipstick

A flipstick modification of this invention is illustrated in FIG. 10a. The flipstick is constructed from material that is movable and preferably transparent, thereby allowing all of the binary letters to be manipulated easily at the same time. The order of the binary letters in FIG. 10a is the same as the order already given both in the last column of Table I and on the front face of the logic tower in FIG. 9b.

In regard to logical operations, the physical movements that act upon the flipstick, used as a single object, are as follows: (OOO), in place and unchanged; (NOO), a left-right flip; (OON), an up-down flip; and (NON), a half turn in either direction. The other combinations introduce complementation (ONO, NNO, ONN, NNN); counterchange mates are located symmetrically with respect to the midpoint of the flipstick (between the sz-letters). As a convenience, using a flipstick for which the logic alphabet has been spaced according to its binomial subsets (1 4 6 4 1), such as is shown in FIG. 10a, makes it easy for the eye to find counter-change mates.

For example, when (NNO), acts on (A b B), the b-letter found on the front face is converted first into a d-letter, following a left-right flip of the flipstick, and then into an h-letter, located symmetrically across the middle from the post-flip d-letter. In like manner, the complete table of 128 basic transformations is embodied in, and can be displayed and performed by, the flipstick of this invention.

Logic Alphabet Board

A further modification of this invention consists of a logic alphabet board, in part illustrated in FIG. 10b. This board is a more elementary version of a flipstick, one that has been built to favor the use of the hand. As an educational device, especially at the sensorimotor level, the outside frame of this model is placed in the orientation shown in FIG. 10a, and then a set of movable and replaceable blocks in the shape of binary letters is put into the cutout openings.

In regard to logical operations, the outside frame is flipped or rotated (OOO, NOO, OON, NON) and, with mates that are located symmetrically across the middle of the board, any letter-block is counterchanged (ONO, NNO, ONN, NNN). In general, whatever manipulatory rule carries the outside frame of the logic alphabet board to a new location, the same rule carries all of the letter-blocks back to their places in the outside frame. Some binary letters, when this is done, remain unchanged in both orientations of the outside frame. These binary letters always belong to the squat half of the logic alphabet (o c u s z n x).

For example, when (OON) acts on the whole row of letter-blocks (OA O* OB), the outside frame is relocated while flipping it from top to bottom, whereupon executing the same flip with each letter-block not only assures that the logical operation has been carried out but it also guarantees that each letter-block, by that manipulatory motion, can be reinserted into the outside frame. Four binary letters (o ɔ c x) in this example remain unchanged in both orientations of the outside frame; a perfect analogue of the required logical operation (OON), they are internally symmetrical with respect to the up-down flip. In like manner, the complete table of 128 basic transformations is embodied in, and can be displayed and performed by, the logic alphabet board of this invention.

Logic Bug

A composite chip called a logic bug is illustrated in FIG. 11. The logic bug is single, movable, and preferably transparent. It is obtained from a front-view, single-plane presentation of the special rhombic dodecahedron shown in FIG. 14a. The symmetrical placement of all of the binary letters with respect to the enlarged o-letter is what gives this composite chip the appearance of having "arms," "legs," and "inside parts," like a bug.

In regard to logical operations, the logic bug is subjected to the same flips and half turns (OOO, NOO, OON, NON); counterchange mates are located symmetrically across the center of the enlarged o-letter (ONO, NNO, ONN, NNN). Placing the ( ɔ c)-letters at the wings and the (u n)-letters at the head-tail puts these binary letters in special categories; they are located at special symmetry positions. That is to say, the ( ɔ c)-letters are up-down self-flips, the (u n)-letters are left-right self-flips, and the members of each pair are counterchange mates to each other.

As an example, when (NNO) acts on (A n B), the n-letter is converted into a u-letter in a special way: the logic bug, as expected, is flipped from left to right, thereby leaving the n-letter unchanged as a result of the self-flip, and then the unchanged n-letter is replaced by its counterchange mate, located across the middle and at the head end of the logic bug. In like manner, the complete table of 128 basic transformations is embodied in, and can be displayed and performed by, the logic bug of this invention.

Polar Network

A composite chip in the form of a polar network is illustrated in FIG. 12. This chip is also single, movable, and preferably transparent. It is obtained from a front-view, peak-in presentation of the special rhombic dodecahedron shown in FIG. 14a. From this view, the binary letters, located at the vertices in FIG. 14a, are symmetrically placed with respect to the network formed by the connecting edges. Such a polar network, as well as the logic bug, could appear as a toy, as a paper weight, as a mantel piece, or the like, for decorative purposes. The computing and teaching features are mentioned below.

In regard to logical operations, flips, half turns, and counterchanges are the same as those described above (see FIG. 11) for the logic bug. Placing the sz- and ox-letters across the center of the polar network also puts these binary letters in special categories; they are also located at special symmetry positions. The sz-letters are not self-flips but they are self-rotates and counterchange mates. The ox-letters are self-flips for both A-negation and B-negation, along with being self-rotates and counterchange mates.

As an example, when (NNN) acts on (A o B), the o-letter is converted into an x-letter in a special way: the polar network is given either the two flips or a half turn, thereby leaving the self-flipping and self-rotating o-letter unchanged, and then the unchanged o-letter is replaced by its counterchange mate. In like manner, the complete table of 128 basic transformations is embodied in, and can be displayed and performed by, the polar network of this invention.

Stem-Count Finder

A modification of this invention, called a stem-count finder, is illustrated in FIG. 13. This modification is constructed from four blocks that are placed in a clock-compass arrangement, with the corners of these blocks marked with binary letters, such as are shown in FIGS. 3 and 13. The stem-count finder is used to obtain immediate visual access to the binomial pattern (1 4 6 4 1) that describes the way in which eacy binary letter, including itself, is so many stem changes (0 1 2 3 4) different from all of the binary letters. This same binomial pattern of stem differences always goes from any one outside corner of the four-block arrangement to the opposite corner.

For example, when the four blocks are placed as is shown in FIG. 13, the o-letter is zero stem changes away from itself (o), one away from (p b q d), two away from (c u s z n ɔ), three away from (h μ ᴨ ʯ ), and four away from (x). This pattern for the o-letter is the same pattern already used for the flipstick, such as is shown in FIG. 10a. For the x-letter, which is the full complement of the o-letter, the blocks remain in the same positions and the same pattern is read in the opposite direction from the opposite corner. For the c-letter, with the blocks still in the same positions, the same pattern starts at 12 o'clock and ends at 6 o'clock. In general, this basic pattern always starts at one outside corner, goes to the nearest outside four, cuts across through the middle six, comes to the outside four on the other side, and finally arrives at the opposite (counterchange) corner.

The same basic pattern, from one outside corner to the opposite corner, can be obtained for all of the binary letters, but not until the four blocks of the stem-count finder are moved into four different arrangements, each one for a specific 4-set of binary letters. Each arrangement, resulting from special crossovers, is obtained by sliding ADJACENT PAIRS of blocks past each other, sliding them across the (J,K)-diagonals shown in FIG. 13. Each crossover brings another 4-set of binary letters into the (9, 12, 6, 3) o'clock corners of the clock-compass. In reference to FIG. 13, the four arrangements of the blocks, along with the accompanying 4-sets of outside corners, are as follows: no crossovers (o c ɔ x); J-diagonal crossover (d q ʯ h); K-diagonal crossover (p ᴨ b ʯ ); and (J,K)-diagonal crossovers (s n u z).

Consequently, no more than two diagonal crossovers of the stem-count finder is needed to place any binary letter in an outside corner, from which in one sweep of the eye is read the (1 4 6 4 1) pattern of stem changes, thereby immediately comparing that binary letter with all of the binary letters. In effect, for the logic alphabet of this invention, the stem-count finder is an adaptation whereby, with extreme convenience, one is able to look from any vertex, through the middle, to the opposite vertex of a 4-dimensional cube, another model of which is shown in FIG. 16.

The Logical Garnet

The logical garnet of this invention, as is illustrated in FIG. 14a, is recognized as a geometrical form that has the shape of a special rhombic dodecahedron. This rhombic dodecahedron is not the same as an ordinary crystal of garnet, which has 14 vertices. Instead, it is a shadow rhombic dodecahedron, one that is obtained when a regular 4-dimensional cube is compressed into a 3-dimensional space and, therefore, one that has 16 vertices. The nature of a shadow rhombic dodecahedron is also described in H. S. M. Coxeter's block entitled "Regular Polytopes" (Third Edition, Dover, 1973, Pages 225-258). It follows that the logical garnet is a "solid shadow;" in other words, a solid because it occupies ordinary space in three dimensions and a shadow because it is compressed from a higher dimensional form. When the compression takes place and the solid shadow is constructed, two of the 16 vertices are fused at the center; consequently, the center of the logical garnet is called a "co-center." Special attention will need to be given to the presence and the function of this co-center.

The primary reason for constructing the logical garnet is that it possesses the optimal amount of symmetry. That is to say, the symmetry properties that go with performing the logical operation of negation are isomorphic to, in other words, they match exactly, the symmetry properties of the binary letters themselves. In effect, the logical garnet is a fundamental embodiment of the logic alphabet of this invention.

In the next step, on a cut-away stick-figure of the solid shadow, such as is shown in FIG. 14a, all of the binary letters are assigned to the vertices of the logical garnet. It further follows that two of the binary letters, in particular two squat letters, the sz-letters, are placed at the co-center and that the remaining fourteen are placed in two surrounding subsets, the tall-eight in the first bolt orbit at the vertices of an internal cube-core, and the other six squat letters in the second orbit at the vertices of an over-all encasing octahedron.

Another consideration is that several varieties of cube-chips may be placed at the vertices of the logical garnet. These cube-chips may have one binary letter on each front face, such as are shown in FIGS. 8c and 14a. They may have the same binary letter on all four faces, for which no drawing is given. They may have rectangular chips wrapped around the four faces, such as is shown in FIG. 8b. They may have four cells on the front face such as is shown in FIG. 6. They may have eight cells constructed from the end-on contraposition of two four-cell panels, such as is shown in FIG. 7. They may be stationary or, the same as the logical garnet as a whole, preferably rotatable. A further consideration, described below, is that any of these cube-chips may be used as the base portion of a special set of chess pieces, such as the example that is shown in FIG. 15. Although not all of the possibilities have been mentioned, each variety of cube-chips is another way of embodying the complete table of 128 basic transformations that is generated by all combinations of flip-mate-flip.

Another view of the logical garnet is shown in FIG. 14b. This view is obtained in two steps. First, the logical garnet, such as is shown in FIG. 14a, is oriented so that the o-letter vertex is placed in front and then it is viewed in polar perspective. Second, the logical garnet in this position is subjected to five vertical cross-sections, each one successively behind the other. These cross-sections, such as is shown in FIG. 14b, slice the logical alphabet into its binomial subsets (1 4 6 4 1). The binary letters in each cross-section are symmetrically arranged, and the sz-letters occupy the co-center, as is shown in the center of the middle cross-section in FIG. 14b.

The binomial subsets of the logic alphabet of this invention (1 4 6 4 1), as is now shown in FIG. 14b, also appeared in the last column of TABLE I, on the binomial sub-towers in FIG. 8c, on the front face of the logic tower in FIGS. 9a and 9b, on the flipstick in FIG. 10a, on the logic alphabet board described for FIG. 10b, and from 9 to 3 o'clock on the stem-counter finder in FIG. 13.

Use of the logical garnet to display and to perform logical operations is explained in the next two subsections, specifically, under what are called Chess-Set Cube-Chips and Eight Logical Garnets.

Chess-Set Cube-Chips

A unique feature of the logic alphabet of this invention is the perfect correspondence that exists between the binary letters on the one hand, in regard to levels of symmetry and the incidence at each level, and chess pieces on the other, in regard to power of these pieces and the incidence of each kind. Another unique feature of this invention is the likewise correspondence between the chess pieces and the vertices of the logical garnet. To illustrate, this double correspondence, a set of chess pieces has been substituted in FIG. 14c for the binary letters in FIG. 14b.

The correspondence between binary letters and chess pieces is as follows. On the highest level of symmetry (Queen and King), the ox-letters are self-flippable and self-rotatable. On the second level (Rocks), the sz-letters are not self-flippable either way but they are self-rotatable. On the third level (Knights and Bishops), the ( ɔ c): and (u n)-letters are self-flippable only one way but they are not self-rotatable. On the lowest level of symmetry (Pawns), which constitutes the eight-chip sub-society described above, the tall-eight, odd-stemmed letters (p b q d h ρ ᑯ ч ) are neither self-flippable nor self-rotatable. In this manner, unique and unexpected, the chess-set correspondence is very helpful in displaying the different patterns that exist not only among the levels of symmetry but also among the sub-societies within the binary letters, as they participate in the complete table of 128 basic transformations.

FIG. 15 illustrates how the chess-set correspondence is used to construct a knight cube-chip, in this particular case, one that has four cells. A full set of these special cube-chips is obtained according to the following routine. Each base portion is adapted from a four-cell cube-chip such as is shown in FIG. 8b, each chess-piece portion is situated in the over-all pattern such as is shown in FIG. 14c, and each chess-set cube-chip is placed at a vertex of the logical garnet such as is shown in FIG. 14a. It should be recalled that these cube-chips may be rigidly attached to the logical garnet, or the base portions, at least, may be independently rotatable.

In regard to logical operations for chess-set cube-chips such as is shown in FIG. 15, quarter turns (NOO, OON) and half turns (NON) are the same as those described for the logic tower (FIG. 9a). Counterchange mates (ONO) are located symmetrically with respect to the co-center of the logical garnet, with the sz-Rooks occupying the co-mate co-center.

For example, when four-cell chess-chips such as is shown in FIG. 15 are attached to the logical garnet such as is shown in FIG. 14a, and when (NNO) acts on (A b B), the b-letter is converted into an h-letter. More specifically, the logical garnet as a whole is rotated a quarter turn from the left, thereby showing the left-side faces of all of the chess chips. This movement carries the b-pawn cube-chip at the near upper-left to the near upper-right, thereby and thereon showing a d-letter, which in turn has its counterchange h-mate showing on the pawn cube-chip located across the co-center at the far lower-left. In like manner, the complete table of 128 basic transformations is embodied in, and can be displayed and performed by, the chess-set logical garnet of this invention.

Eight Logical Garnets

FIG. 17 is an illustration of eight logical garnets that are presented as a schematic model of what happens when one logical garnet is acted upon by three external mirros. A complete model, in all of its detail, is constructed from eight components, wherein the binary letters (128 of them) are assigned to eight sets of cube-vertices, all of them properly situated and labelled. More specifically, the fundamental eight-cell arrangement of this invention is generated, in all of its detail, when the logical garnet in FIG. 14a is placed in the near lower-left octant (OOO) of FIG. 17 and then, after being externally framed by three mutually perpendicular planes, it is kaleidoscopically acted upon by three primitive mirrors that are located in these planes. These mirror planes are schematically illustrated in the center of FIG. 17.

In general, any 4-set of logical garnets that are located on the same side of any primitive mirror is reflected, simultaneously, to the other side of that mirror. As expected, the left-right mirror plane (NOO) is A-negation and the up-down mirror plane (OON) is B-negation. The surprise is that duality (NNN) is being treated as an independent mirror plane, such as is shown in FIG. 17, wherein it is placed in the front-back direction. It should be recalled that in FIG. 6 the dual (NNN) of a four-cell chip is another four-cell chip that is located symmetrically across the polar axis of the clock compass, these pairs by end-on contraposition giving rise to eight-cell cube-chips, such as is shown in FIG. 7. As an additional source of information, the eight-cell structure of mirror reflections is also described in F. J. Budden's book entitled "The Fascination of Groups" (Cambridge University Press, London, 1972, Pages 277–278).

In regard to logical operations, the eight-cell arrangement of logical garnets, such as is shown in FIG. 17, is a basic lesson in transformational facility. This condition follows from the fact that all of the 128 binary letters in FIG. 17, in eight subsets of sixteen, are oriented in their respective logical garnets so that, in a single presentation, all of the possible flips, half turns, and counterchanges are cast, by mirror reflections, into a large scale repeat of the same small scale movements of the individual symbols. It further follows that FIG. 17 is easily partitioned into subsets of logical transformations. The 16 identity transformations, such as is shown on the front face of FIG. 9b, are situated at the (OOO) identity garnet of FIG. 17, which is a repeat of FIG. 14a. The 64 transformations, such as is shown in the four columns of FIG. 9b, are situated in the front four garnets of FIG. 17 (OOO, NOO, OON, NON). The other 64 transformations, such as is shown in the same four columns of FIG. 9b, when they are taken in reverse order for the additional operation of counterchange, are situated in the back four garnets of FIG. 17 (ONO, NNO, ONN, NNN). Consequently, in terms of the symmetry properties of the binary letters, the eight-cell arrangement of logical garnets is an exact embodiment of the complete table of 128 basic transformations. From this approach, the physical model illustrated in FIG. 17 may also serve as an introduction to the crystallography of logic.

In regard to a specific example for FIG. 17, when the four triplets (OOO), (NOO), (OON), and (NON) act on (A o B), the o-letter is repeatedly converted into itself, always another o-letter. These o-letters are located at the head-on, closest cube-vertices of the front four garnets (FIG. 17). This outcome emphasizes that the o-letter (Queen) is self-flippable and self-rotatable. The same outcome also appears on the four-cell chip of o-letters at 9 o'clock (FIG. 6). When the example at hand is extended so that the four triplets (ONO), (NNO), (ONN), and (NNN) act on (A o B), the o-letter is repeatedly converted into x-letters. These x-letters are located at the tail-away, hidden cube-vertices on the back of the back four garnets (FIG. 17). In each case not only serving as a counterchange mate with respect to the center point of the total model where the mirror planes intersect, the x-letter (King) is also self-flippable and self-rotatable. The same outcome also appears on the four-cell chip of x-letters at 3 o'clock (FIG. 6). Combining the four head-on o-letters with the four tail-away x-letters is another way of constructing the corresponding eight-cell cube-chip (FIG. 7).

In like manner, each binary letter in the (OOO) identity garnet generates its own set of eight outcomes, one for each garnet. The cube-vertices for each set of eight outcomes take the shape of a distinct rectangular box that is symmetrically situated with respect to the center point that is equally distant from all eight garnets. The binary letters in the 8-sets of vertices from all sixteen of these between-garnet boxes constitute the complete table of 128 basic transformations, such as is embodied in FIG. 17.

Three Internal Mirrors

The dynamic use of three internal mirrors does not generate an eight-cell arrangement of logical garnets, such as is shown in FIG. 17. Instead, using three mirrors in this way leads to internal shifting that takes place within only one logical garnet, such as is shown in FIG. 14a. For example, by way of a cross-section through the logical garnet that is shown in FIG. 14a, the primitive, internal mirror (NOO) cuts down through the middle from front to back, for which the (o u s z n x) letters lie in this mirror plane. When the (NOO) mirror is activated, the two halves of the logical garnet, one on the left and one on the right, are by reflection carried both ways into each other. As an inherent part of the same transformation, the binary letters that lie in the (NOO) mirror plane, except for the sz co-center, are self-flippable from left to right.

In like manner, the same logical garnet can be internally subjected to the eight combinations of mirror reflections, namely, OOO, NOO, OON, NON, along with ONO, NNO, ONN, and NNN. As a result, this process does not generate a static eight-cell arrangement of logical garnets, such as is shown in FIG. 17. Instead, it leads to eight arrangements of internal shifting that dynamically takes place within only one logical garnet. These arrangements are another way of specifying the (8×16) table for the complete set of 128 basic transformations. In this case, at their best, the symmetry properties inherent in the binary letters of this invention give direct evidence that they match the symmetry properties of the logical operations being performed, and vice versa.

Tesseract of Cube-Chips

A tesseract of cube-chips, such as is illustrated in FIG. 16, is constructed to serve as a 3-dimensional model of a 4-dimensional cube. This model consists of a stick-figure of eight cube-vertices that is placed inside of a larger stick-figure of eight cube-vertices, and for which the eight pairs of corresponding cube-vertices are connected by radiating spokes. Again, in reference to the variety of cube-chips described for the logical garnet (FIG. 14a), there are several kinds of cube-chips that can be placed at the sixteen vertices of the tesseract. It should be recalled that these cube-chips may be rigidly attached to the tesseract, or they may be independently rotatable.

In reference to logical operations for cube-chips such as are shown in FIGS. 8b and 15, quarter turns (NOO, OON) and half turns (NON) are the same as those described for the logic tower (FIG. 9a). Counterchange mates (ONO) are located on a diagonal that passes through the center of the tesseract, such that the mate for any vertex in one stick-figure cube is at the opposite vertex in the other stick-figure cube. The mate of the o-letter, for instance, is across the center at the x-letter, which is located in the far upper-right of the small stick-figure cube.

For example, when using four-cell cube-chips such as is shown in FIG. 8b, and when (NNN) acts on (A u B), the u-letter is converted into itself, another u-letter. More specifically, the tesseract is given a half turn in either direction, thereby showing the back faces of all of the cube-chips. This movement carries the u-chip at the far upper-left to the near upper-right, thereby and thereon showing an n-letter, which in turn has its counterchange u-mate showing on the cube-chip located inside of the tesseract across the center at the far lower-left. That is to say, the half turn of the u-letter is neutralized by the counterchange of the n-letter, thereby yielding itself, another u-letter. In like manner, the complete table of 128 basic transformations is embodied in, and can be displayed and performed by, the tesseract adapted to the logic alphabet of this invention.

More Elaborate Embodiments

The embodiments considered above have repeatedly called attention to the complete table of 128 basic transformations. In other words, these embodiments have emphasized that eight combinations of negation acting on the sixteen binary letters constitute a fundamental part of the two-valued logic of two sentences. It will, of course, be appreciated that there are many additional varieties of these embodiments.

Several examples will show this point by placing previously described components into previously described arrangements. An eight-cell of flipsticks places components such as is shown in FIG. 10a into the arrangement such as is shown in FIG. 17. A logical garnet of eight-cell cube-chips places components such as is shown in FIG. 7 into the arrangement such as is shown in FIG. 14a. For a more complex logical structure, a clock compass of logical garnets places components such as is shown in FIG. 14a into the arrangement such as is shown in FIG. 3. Even more complex, but still in reference to the two-valued logic of two sentences, it is meaningful to construct a third order logical garnet, for which the components such as is shown in FIG. 14a are placed at the vertices of FIG. 14a, which in turn is repeated 16 times and then stacked into a super-chip having the same arrangement such as is shown in FIG. 14a.

All of these examples have one thing in common. Binary chips are the basic building blocks, on which the binary letters are the atoms that appear in the proper number and orientation.

Extension of the Notation and Combinations of Composite Chips

Use of the binary chips, one of each of the sixteen binary connectives and all of them as a fundamental part of twovalued logic, need not be limited to two sentences (A,B). The same approach, such as has been described for the above embodiments, can also be extended to a universe of more than two sentences. For example, 256 arrangements of binary chips are needed to represent the 256 ternary connectives for three sentences (A,B,C). Likewise, 65,536 arrangements of binary chips are needed to represent the 65,536 quaternary connectives for four sentences (A,B,C,D). Even though arrangements of binary chips can be extended to any number of sentences, the ordinary use of hand-operated manipulatory chips is especially convenient when the logic alphabet of this invention is applied to any combination of four sentences. It would be possible to use wooden trays and mirrors, also machines, to cope with the rapidly growing number of connectives that go with a large number of sentences.

Ternary connectives are represented by ternary chips, for which pairs of binary chips are placed side by side. By this arrangement, 16 times 16 yields the 256 two-cell chips needed to represent all of the ternary connectives. For example, two o-chips placed side by side, that is, a two-cell oo-chip, is the ternary chip for contradiction. The primitive rules for A-negation, B-negation, and counterchange are retained. For example, the xx-chip, also called tautology, is the counterchange mate of the oo-chip. C-negation is the added operation, for which the two binary chips are exchanged from left to right. For example, C-negation of the xd-chip is the dx-chip. FIG. 18 further illustrates how ternary connectives are embodied in the extended system of manipulatory chips. In this case, when negation (N) acts on conjunction (od), it yields the corresponding counterchange mate (xh), such as is also shown as single operations in both sides of FIG. 5a In like manner, when all combinations of (A,B,C)-negation and counterchange act upon the 256 ternary chips, the number obtained from 16 times 256 yields a complete table of 4096 basic transformations that exist in the two-valued logic of three sentences.

Quaternary connectives are represented by quaternary chips, for which pairs of ternary chips are placed one above the other. By this arrangement, 256 times 256 yields the 65,536 four-cell chips needed to represent all of the quaternary connectives. For example, placing two oo-chips one above the other yields the quaternary chip for contradiction. This chip is a four-cell chip of o-letters, similar to what is shown at 9 o'clock in FIG. 6, but which, as separable components, is now being used in another context for another purpose. Likewise, the separable four-cell of x-letters, similar to what is shown at 3 o'clock, is the corresponding counterchange mate. D-negation is the added operation, for which the two ternary chips are exchanged from top to bottom.

For example, D-negation of a quaternary chip that has od-above and oo-below, which is the one for conjunction, is another quaternary chip that has oo-above and od-below. FIG. 19 further illustrates how quaternary connectives are embodied in the extended system of manipulatory chips. In this case, when negation (N) acts on conjunction (oood), it yields the corresponding counterchange mate (xxxh).

In like manner, when all combinations of (A,B,C,D)-negation and counterchange act upon the 65,536 quaternary chips, the number obtained from 32 times 65,536 yields a complete table of 2,097,152 basic transformations that exist in the two-valued logic of four sentences.

It is thus apparent that the use of manipulatory chips can be extended to any number of sentences. Composite chips for n-ary connectives are arranged according to a simple rule. For an odd number of sentences, two (n−1)-ary composite chips are placid side by side, such as is shown in FIG. 18; for an even number of sentences, two (n−1)-ary composite chips are placed one above the other, such as is shown in FIG. 19. Some ingenuity is required to handle the large number of components in these patterns of composite chips.

Also in like manner, several physical models can be built for the logical structures that go with additional sentences. Although the above presentation has favored those models that embody the 128 basic transformations for two sentences, it will be appreciated that even more elaborate models can be custom-designed, in a similar fashion, to reflect the systems of composite chips for more than two sentences.

What is claimed is:

1. An apparatus for displaying and performing a complete set of the sixteen binary connectives in a two-valued notational system, said apparatus comprising:
a set of six devices, each device including a first area and a second area opposed to the first area, each first area including a symbol, and each second area including a same-shape repeat in see-through orientation of the symbol on the corresponding first area;
each of said symbols having a shape selected to indicate a selected number of from zero to four components arranged with respect to the quadrants of a set of Cartesian corrdinates, wherein the shapes of said symbols have iconicity, eusymmetry, and frame consistency with respect to said quadrants of Cartesian coordinates and the alignments of said shapes of said symbols are symmetry positional with respect to the axes of said Cartesian coordinates;
said six symbols on said first areas chosen such that said six devices can be positioned by a combination of rotation and flip operations to display and perform all sixteen binary connectives.

2. The apparatus of claim 1 wherein each of said six devices includes a different symbol selected from a font of binary letters consisting of o, b, s, ɔ, ɑ, x, whereby said symbols can readily be assigned a phonetic value.

3. An apparatus for displaying and performing a complete set of the sixteen binary connectives in a two-valued notational system, said apparatus comprising:
a set of eight devices, each device including a first area and a second area opposed to the first area, each first area including a symbol, and each second area including a same-shape repeat in see-through orientation of the symbol on the corresponding first area;
each of said symbols having a shape selected to indicate a selected number of from zero to four components arranged with respect to the quadrants of a set of Cartesian coordinates, wherein the shapes of said symbols have iconicity, eusymmetry, and frame consistency with respect to said quadrants of Cartesian coordinates and the alignments of said shapes of said symbols are symmetry positional with respect to the axes of said Cartesian coordinates;
said eight symbols on said first areas chosen such that said eight devices can be positioned by a combination of rotation and flip operations to display and perform all sixteen binary connectives.

4. The apparatus of claim 3 wherein each of said eight devices includes a different symbol selected from a font of binary letters consisting of o, b, s, z, n, ɔ, ɑ, x.

5. An apparatus for displaying and performing a complete set of the sixteen binary connectives in a two-valued notational system, said apparatus comprising:
a set of sixteen devices, each device including a first area and a second area opposed to the first area, each first area including a symbol, and each second area including a same-shape repeat in see-through orientation of the symbol on the corresponding first area;
each of said symbols having a shape selected to indicate a selected number of from zero to four components arranged with respect to the quadrants of a set of Cartesion coordinates, wherein the shapes of said symbols have iconicity, eusymmetry, and frame consistency with respect to said quadrants of Cartesian coordinates and the alignments of said shapes of said symbols are symmetry positional with respect to the axes of said Cartesian coordinates;
said sixteen symbols chosen such that said sixteen devices can be positioned by a combination of rotation and flip operations to display and perform all sixteen binary connectives.

6. The apparatus of claim 5 wherein each of said sixteen devices includes a different symbol selected from a font of binary letters consisting of o, p, b, q, d, c, u, s, z, n, ɔ, h, ρ, ɑ, ɥ, x, whereby said symbols can readily be assigned a phonetic value.

7. An apparatus for displaying and performing a complete set of the sixteen binary connectives in a two-valued notational system, said apparatus comprising:
a set of sixteen devices, each device including a first area and a second area opposed to the first area, each first area including a symbol, and each second area including a counterchange character corresponding to the counterchange of the symbol on the corresponding first area;
each of said symbols and each of said counterchange characters having a shape selected to indicate a selected number of from zero to four components arranged with respect to the quadrants of a set of Cartesian coordinates, wherein the shapes of said symbols and said counterchange characters have iconicity, eusymmetry, and frame consistency with respect to said quadrants of Cartesian coordinates and the alignments of said shapes of said symbols and said counterchange characters are symmetry positional with respect to the axes of said Cartesian coordinates;
wherein for each of the sixteen devices the presence and absence of the components of the corresponding counterchange character are reversed with respect to the components of the corresponding symbol; and wherein said sixteen symbols are chosen such that said sixteen devices can be positioned by a combination of rotation and flip operations to display and perform all sixteen binary connectives.

8. The apparatus of claim 5 wherein each of said sixteen devices includes a different symbol selected from a font of binary letters consisting of o, p, b, q, d, c, u, s, z, n, ɔ, h, ρ, ɥ, ɥ, x, whereby said symbols can readily be assigned a phonetic value.

* * * * *

UNITED STATES PATENT OFFICE
CERTIFICATE OF CORRECTION

Patent No. 4,273,542      Dated June 16, 1981

Inventor(s) Shea Zellweger

It is certified that error appears in the above-identified patent and that said Letters Patent are hereby corrected as shown below:

Column 1, line 16, change "connective" to --connectives--.
Column 1, line 32, after "each" change "as" to --an--.
Column 1, line 33, change "between" to --among--.
Column 2, line 16, change "by" to --to--.
Column 2, line 43, change "fifteen" to --twenty--.
Column 3, line 17, after "but" insert --they--.
Column 3, line 19, before "give" insert --they--.
Column 4, line 15, change "co-ordinates" to --coordinates--.
Column 5, TABLE I, last column, second entry, change "P" to --p--.
Column 8, line 66, change "X" to --x--.
Column 10, line 12, change "opague" to --opaque--.
Column 10, line 37, change "as" to --at--.
Column 11, line 67, change "and" to --the--.
Column 12, line 16, change "⊃-letter" to --⊣-letter--.
Column 12, line 16, change "⊣-letter" to --⊃-letter--.
Column 13, line 58, after "symbols" insert a comma.
Column 13, line 59, after "added" insert a comma.
Column 16, line 13, change "pat" to --part--.
Column 16, line 26, change "the" to --and--. (2nd occurr.)
Column 17, line 67, change "OON" to --ONN--.
Column 18, line 29, change "counter-change" to --counterchange--.
Column 18, line 61, before "x" insert --⊃--.
Column 19, lines 21 and 22, omit "symmetrically".
Column 19, line 23, before "Placing" insert --As seen in Figure 11, for even-stemmed binary letters, the counterchange pairs are located symmetrically with respect to the enlarged o-letter. For odd-stemmed binary letters, the counterchange pairs are located alternatively inside and outside of the enlarged o-letter.--.

UNITED STATES PATENT OFFICE
CERTIFICATE OF CORRECTION

Patent No. 4,273,542　　　　　Dated　June 16, 1981

Inventor(s)　Shea Zellweger

It is certified that error appears in the above-identified patent and that said Letters Patent are hereby corrected as shown below:

Column 19, line 45, change "peak-in" to --peek-in--.
Column 20, line 14, change "eacy" to --each--.
Column 20, line 18, after "opposite" insert --outside--.
Column 20, line 35, after "opposite" insert --outside--.
Column 20, line 38, after "opposite" insert --outside--.
Column 20, line 50, change "Ч" to --Р--.
Column 21, line 6, change "block" to --book--.
Column 21, line 34, omit "bolt".
Column 22, line 31, change "Rocks" to --Rooks--.
Column 22, line 34, replace the colon with a hyphen.
Column 23, line 16, change "mirros" to --mirrors--.
Column 26, line 13, after "one" change "of" to --for--.
Column 26, line 15, change "twovalued" to --two-valued--.
Column 28, line 17, in place of "x." insert --x, whereby said symbols can readily be assigned a phonetic value.--.
Column 30, line 3, change "claim 5" to --claim 7--.

Signed and Sealed this

*Thirtieth* Day of *April 1985*

[SEAL]

*Attest:*

DONALD J. QUIGG

*Attesting Officer*　　*Acting Commissioner of Patents and Trademarks*